US011019255B2

(12) United States Patent
Hu et al.

(10) Patent No.: US 11,019,255 B2
(45) Date of Patent: May 25, 2021

(54) DEPTH IMAGING SYSTEM AND METHOD OF RENDERING A PROCESSED IMAGE TO INCLUDE IN-FOCUS AND OUT-OF-FOCUS REGIONS OF ONE OR MORE OBJECTS BASED ON USER SELECTION OF AN OBJECT

(71) Applicant: SZ DJI TECHNOLOGY CO., LTD., Shenzhen (CN)

(72) Inventors: Pan Hu, Shenzhen (CN); You Zhou, Shenzhen (CN); Linchao Bao, Shenzhen (CN); Xuyang Feng, Shenzhen (CN); Chenglin Mao, Shenzhen (CN); Zisheng Cao, Shenzhen (CN); Cong Zhao, Shenzhen (CN); Jiaqi Yan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/425,090

(22) Filed: May 29, 2019

(65) Prior Publication Data
US 2019/0281214 A1    Sep. 12, 2019

Related U.S. Application Data

(63) Continuation of application No. PCT/CN2016/107582, filed on Nov. 29, 2016.

(51) Int. Cl.
*H04N 5/232* (2006.01)
*H04N 5/222* (2006.01)
(Continued)

(52) U.S. Cl.
CPC ....... *H04N 5/23229* (2013.01); *B64C 39/024* (2013.01); *G06F 3/00* (2013.01);
(Continued)

(58) Field of Classification Search
CPC .. H04N 5/23229; H04N 5/232; H04N 5/2226; H04N 13/239; H04N 13/271;
(Continued)

(56) References Cited

U.S. PATENT DOCUMENTS 9,344,619 B2 *    5/2016   Shroff ................. H04N 5/2226
9,591,270 B1 *    3/2017   Tyson ..................... H04N 7/18
(Continued)

FOREIGN PATENT DOCUMENTS

CN        102445756 A      5/2012
CN        102968814 A      3/2013
(Continued)

OTHER PUBLICATIONS

World Intellectual Property Organization (WIPO) International Search Report and Written Opinion for PCT/CN2016/107582 dated Aug. 25, 2017 6 Pages.

*Primary Examiner* — Twyler L Haskins
*Assistant Examiner* — Akshay Trehan
(74) *Attorney, Agent, or Firm* — Anova Law Group, PLLC

(57) ABSTRACT

A method of image processing includes obtaining depth information respectively corresponding to one or more objects in an image frame captured by an imaging system based on spatial configuration of the imaging system, calculating one or more rendering parameters associated with one of the one or more objects in the image frame based on at least the depth information of the one or more objects, and (Continued)

rendering the image frame using the one or more rendering parameters to obtain a processed image frame. The processed image frame includes an in-focus region and an out-of-focus region relative to the one of the one or more objects.

17 Claims, 16 Drawing Sheets

(51) Int. Cl.
| | |
|---|---|
| H04N 13/239 | (2018.01) |
| H04N 13/271 | (2018.01) |
| H04N 13/00 | (2018.01) |
| G06T 5/00 | (2006.01) |
| G06T 5/50 | (2006.01) |
| G06T 7/50 | (2017.01) |
| G06T 7/55 | (2017.01) |
| B64C 39/02 | (2006.01) |
| G06F 3/00 | (2006.01) |

(52) U.S. Cl.
CPC .............. *G06T 5/002* (2013.01); *G06T 5/50* (2013.01); *G06T 7/50* (2017.01); *G06T 7/55* (2017.01); *H04N 5/2226* (2013.01); *H04N 5/232* (2013.01); *H04N 5/23238* (2013.01); *H04N 5/232121* (2018.08); *H04N 13/239* (2018.05); *H04N 13/271* (2018.05); *B64C 2201/127* (2013.01); *G06T 2207/10021* (2013.01); *G06T 2207/10032* (2013.01); *G06T 2207/20012* (2013.01); *H04N 2013/0081* (2013.01)

(58) Field of Classification Search
CPC ......... H04N 5/232121; H04N 5/23238; H04N 2013/0081; G06T 5/002; G06T 7/55; G06T 5/50; G06T 7/50; G06T 2207/10021; G06T 2207/10032; G06T 2207/20012; B64C 39/024; B64C 2201/127; G06F 3/00
USPC ...................................... 348/36–39, 144–147
See application file for complete search history.

(56) References Cited

U.S. PATENT DOCUMENTS

| | | | |
|---|---|---|---|
| 2008/0084584 A1* | 4/2008 | Kauhanen | H04N 5/23212 358/3.27 |
| 2012/0057070 A1* | 3/2012 | Park | H04N 5/2356 348/345 |
| 2013/0027553 A1* | 1/2013 | Silny | G01J 1/08 348/144 |
| 2013/0058591 A1* | 3/2013 | Nishiyama | H04N 5/217 382/264 |
| 2013/0063571 A1* | 3/2013 | Ishii | G06T 5/003 348/47 |
| 2013/0121609 A1* | 5/2013 | Zhang | G06T 5/003 382/264 |
| 2015/0002734 A1* | 1/2015 | Lee | H04N 5/3532 348/367 |
| 2015/0029311 A1* | 1/2015 | Cheng | G06F 3/04815 348/46 |
| 2015/0033157 A1* | 1/2015 | Chang | G06T 19/20 715/763 |
| 2015/0092078 A1* | 4/2015 | Corcoran | G06K 9/32 348/222.1 |
| 2015/0178970 A1* | 6/2015 | Pham | G06K 9/6256 382/190 |
| 2016/0012268 A1 | 1/2016 | Wang | |
| 2016/0104285 A1* | 4/2016 | Pettegrew | H04N 5/2252 348/36 |
| 2017/0039859 A1* | 2/2017 | Hu | G08G 5/0034 |
| 2017/0053169 A1* | 2/2017 | Cuban | H04N 7/185 |
| 2017/0283088 A1* | 10/2017 | Sabe | G05D 1/0094 |
| 2017/0352159 A1* | 12/2017 | Aravkin | G06T 7/50 |
| 2018/0025498 A1* | 1/2018 | Omari | G06K 9/00711 348/144 |
| 2018/0046187 A1* | 2/2018 | Martirosyan | G05D 1/0094 |
| 2018/0046188 A1* | 2/2018 | Hwang | G06T 7/277 |

FOREIGN PATENT DOCUMENTS

| | | | | |
|---|---|---|---|---|
| CN | 103426143 | * | 4/2013 | ............... G06T 3/00 |
| CN | 103426143 A | | 12/2013 | |
| CN | 103945118 A | | 7/2014 | |
| CN | 104349049 A | | 2/2015 | |
| CN | 105705979 A | | 6/2016 | |

* cited by examiner

700

702
Obtain depth information respectively corresponding to one or more objects in a first image frame captured by an imaging system based on spatial configuration of the imaging system.

704
Calculate one or more rendering parameters associated with a first object of the one or more objects in the first image frame based on at least the respective depth information of the one or more objects.

706
Render a processed image based on the first image frame using the one or more rendering parameters, wherein the processed image frame includes an in-focus region and an out-of-focus region relative to the first object.

 

710
Obtaining the depth information respectively corresponding to one or more objects comprises:
obtaining the spatial configuration of the imaging system, when the imaging system captures the first image frame.

712
The imaging system comprises a monocular imaging device borne on a movable platform, and the one or more sensors are configured to measure translational and rotational movement data of the imaging system during a time period when the first image frame is captured by the monocular imaging device.

714
The one or more sensors comprise at least an inertial measurement unit (IMU) associated with the movable platform.

716
The rotational data and the transitional data are used to determine the depth information of the one or more objects.

718
The one or more sensors comprise a visual odometry (VO) system configured to provide motion information of the imaging system.

720
The one or more sensors comprise a depth sensor configured to provide the depth information of the one or more objects.

722
The imaging system comprises a plurality of stereoscopic imaging devices configured to capture a plurality of stereoscopic image frames that provide the depth information of the one or more objects.

724
The spatial configuration of the imaging system includes at least a distance between a pair of stereoscopic imaging devices in the plurality of stereoscopic imaging devices.

750
Select, in the first image frame, the first object from the one or more objects.

752
Selecting the first object from the one or more objects comprises: receiving a user selection of the first object from the one or more objects.

754
Selecting the first object from the one or more objects comprises: receiving a user input to provide an aperture parameter.

756
The first object selected from the one or more objects is included in the in-focus region.

758
The first object selected from the one or more objects is included in the out-of-focus region.

730
Group the one or more objects in the first image frame into a number of layers based on the depth information of the respective objects.

732
Calculating the one or more rendering parameters comprises:
calculating a plurality of rendering parameters corresponding to the number of layers respectively based on the depth information associated with each layer.

734
Rendering the first image frame comprises:
rendering each layer of the number of layers using a corresponding rendering parameter of the plurality of rendering parameters.

736
Rendering the first image frame comprises:
applying Gaussian blurs to one or more layers using rendering parameters corresponding to the one or more layers respectively.

738
The one or more layers include the first object.

740
The one or more layers do not include the first object.

742
Smooth transitions of rendering effects to the number of layers.

760
The imaging system is borne on a movable platform, and wherein the electronic device is located on a remote configured to remotely control the movable platform.

762
The imaging system is borne on a movable platform, and wherein the electronic device is borne on the movable platform and communicably coupled to the imaging system.

764
Stitch a panorama view as the first image frame using a set of image frames captured by the imaging system, wherein the panorama view includes more objects than any one of the selected set of image frames.

766
Render the panorama view using the one or more rendering parameter.

768
Track the first object in one or more image frames captured by the imaging system.

Figure 7E

DEPTH IMAGING SYSTEM AND METHOD OF RENDERING A PROCESSED IMAGE TO INCLUDE IN-FOCUS AND OUT-OF-FOCUS REGIONS OF ONE OR MORE OBJECTS BASED ON USER SELECTION OF AN OBJECT

CROSS-REFERENCE TO RELATED APPLICATION

This application is a continuation of International Application No. PCT/CN2016/107582, filed on Nov. 29, 2016, the entire content of which is incorporated herein by reference.

TECHNICAL FIELD

The disclosed embodiments relate generally to image processing and more particularly, but not exclusively, to adjusting image focus of an image captured by a movable platform.

BACKGROUND

Movable platforms such as unmanned aerial vehicles (UAVs) can be used for performing surveillance, reconnaissance, and exploration tasks for military and civilian applications. A movable platform may carry a payload configured to perform a specific function. For example, the payload may include an imaging device for capturing image data of the surrounding environment for creating image content (e.g., images or videos) of objects in the surrounding environment. It is important to process the image data successfully and effectively to obtain various artistic effects.

SUMMARY

There is a need for systems and methods for devices that process image data to achieve a selective focus effect (e.g., a selective depth of field effect). Such systems and methods optionally complement or replace conventional methods for image processing. By obtaining spatial configuration of an imaging system using one or more sensors associated with the imaging system, depth information of an image captured by the imaging system can be efficiently and accurately determined using the spatial configuration. By rendering the image using one or more rendering parameters determined based on the depth information, some embodiments of the present application can adjust focus of the image. The spatial configuration of the imaging system can be obtained based on sensor data from the one or more sensors associated with the imaging system. Additionally, the image processing techniques as disclosed herein can be performed after or in real time as the movable platform moves along a path and captures image(s). Furthermore, the image processing techniques can be performed on board the movable platform or remotely from the movable platform.

In accordance with some embodiments, a method for processing an image comprises: obtaining depth information respectively corresponding to one or more objects in a first image frame captured by an imaging system based on spatial configuration of the imaging system. One or more rendering parameters associated with a first object of the one or more objects in the first image frame are calculated based on at least the respective depth information of the one or more objects. The first image frame is rendered using the one or more rendering parameters to obtain a processed image frame. The processed image frame includes an in-focus region and an out-of-focus region relative to the first object.

In accordance with some embodiments, an unmanned aerial vehicle (UAV) may comprise a propulsion system, one or more sensors, an imaging system, and one or more processors coupled to the propulsion system, the one or more sensors, and the imaging device. The one or more processors are configured for performing the operations of the above method. In accordance with some embodiments, a system may comprise one or more processors memory; and one or more programs. The one or more programs are stored in the memory and configured to be executed by the one or more processors. The one or more programs including instructions for performing the operations of the above method. In accordance with some embodiments, a non-transitory computer-readable storage medium has stored therein instructions that, when executed by an electronic device, cause the electronic device to perform the operations of the above method.

BRIEF DESCRIPTION OF THE DRAWINGS

FIGS. 7A-7E are a flow diagram illustrating a method for image processing to adjust imaging focus, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The following description uses an unmanned aerial vehicle (UAV) as an example of a movable platform. UAVs include, e.g., fixed-wing aircrafts and rotary-wing aircrafts such as helicopters, quadcopters, and aircraft having other numbers and/or configurations of rotors. In some embodiments, the movable platform also includes, but is not limited to, a self-driving car (i.e., an autonomous car, a driverless car), a virtual reality (VR) headset, an augmented reality (AR) headset, a handheld gimbal with a camera and image processing capabilities. It will be apparent to those skilled in the art that other types of movable platforms may be substituted for UAVs as described below, such as a mobile phone, a tablet, or a remote control. In some embodiments, the movable platform includes a carrier or a gimbal configured to carry a payload including an imaging device.

The present disclosure provides techniques related to processing image data captured by an imaging device borne on a UAV for creating artistic effects, such as a selective focus effect. In some embodiments, one or more image frames are captured using an imaging system borne on a movable platform. Image processing techniques disclosed in the present application are used to process the captured image frames by obtaining depth information of one or more objects in the plurality of image frames based on spatial configuration of the imaging system. The spatial configuration of the imaging system is obtained from a plurality of sensors. The plurality of sensors include a GPS and an IMU associated with the movable platform. The spatial configuration of the imaging system can also be obtained from relative positional information of a pair of stereoscopic cameras. One or more rendering parameters associated with a first object in a first image frame are calculated based on at least the depth information. The first image frame is rendered using the one or more rendering parameters to obtain a processed image frame including an in-focus region and an out-of-focus region relative to the first object.

Figure 1:
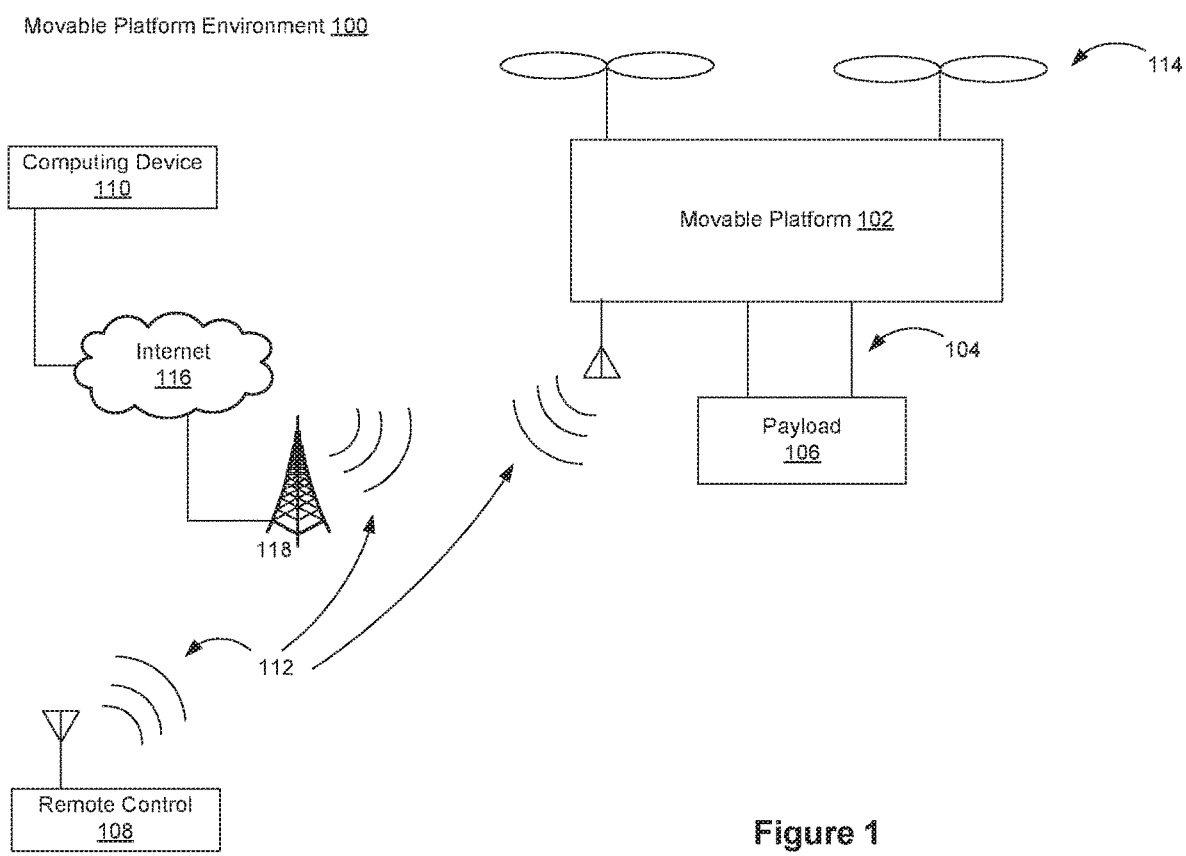
FIG. 1 illustrates a movable platform environment, in accordance with some embodiments.

FIG. 1 illustrates a movable platform environment 100, in accordance with some embodiments. The movable platform environment 100 includes a movable platform 102. In some embodiments, the movable platform 102 includes a carrier 104 and/or a payload 106.

In some embodiments, the carrier 104 is used to couple the payload 106 to the movable platform 102. In some embodiments, the carrier 104 includes an element (e.g., a gimbal and/or damping element) to isolate the payload 106 from movement of the movable platform 102 and/or the movement mechanism 114. In some embodiments, the carrier 104 includes an element for controlling movement of the payload 106 relative to the movable platform 102.

In some embodiments, the payload 106 is coupled (e.g., rigidly coupled) to the movable platform 102 (e.g., coupled via carrier 104) such that the payload 106 remains substantially stationary relative to movable platform 102. For example, the carrier 104 is coupled to the payload 106 such that the payload is not movable relative to the movable platform 102. In some embodiments, the payload 106 is mounted directly to the movable platform 102 without requiring the carrier 104. In some embodiments, the payload 106 is located partially or fully within the movable platform 102.

In some embodiments, a remote control 108 communicates with the movable platform 102, e.g., to provide control instructions to the movable platform 102 and/or to display information received from the movable platform 102 on a display (not shown) of the remote control 108. Although the remote control 108 is typically a portable (e.g., handheld) device, the remote control 108 need not be portable. In some embodiments, the remote control 108 is a dedicated control device (e.g., for the movable platform 102), a laptop computer, a desktop computer, a tablet computer, a gaming system, a wearable device (e.g., glasses, a glove, and/or a helmet), a microphone, a portable communication device (e.g., a mobile telephone) and/or a combination thereof.

In some embodiments, an input device of the remote control 108 receives user input to control aspects of the movable platform 102, the carrier 104, the payload 106, and/or a component thereof. Such aspects include, e.g., orientation, position, orientation, velocity, acceleration, navigation, and/or tracking. For example, a position of an input device of the remote control 108 (e.g., a position of a component of the input device) is manually set by a user to a position corresponding to an input (e.g., a predetermined input) for controlling the movable platform 102. In some embodiments, the input device is manipulated by a user to input control instructions for controlling the navigation of the movable platform 102. In some embodiments, an input device of remote control 108 is used to input a flight mode for the movable platform 102, such as auto pilot or navigation according to a predetermined navigation path.

In some embodiments, the display (not shown) of the remote control 108 displays information generated by the movable platform sensing system 210, the memory 204, and/or another system of the movable platform 102. For example, the display displays information about the movable platform 102, the carrier 104, and/or the payload 106, such as position, orientation, orientation, movement characteristics of the movable platform 102, and/or distance between the movable platform 102 and another object (e.g., a target and/or an obstacle). In some embodiments, information displayed by the display of remote control 108 includes images captured by an imaging device 216 (FIG. 2A), tracking data (e.g., a graphical tracking indicator applied to a representation of a target), and/or indications of control data transmitted to the movable platform 102. In some embodiments, information displayed by the display of the remote control 108 is displayed in substantially real-time as information is received from the movable platform 102 and/or as image data is acquired. In some embodiments, the display of the remote control 108 is a touchscreen display.

In some embodiments, the movable platform environment 100 includes a computing device 110. The computing device 110 is, e.g., a server computer, a cloud server, a desktop computer, a laptop computer, a tablet, or another portable electronic device (e.g., a mobile telephone). In some embodiments, the computing device 110 is a base station that communicates (e.g., wirelessly) with the movable platform 102 and/or the remote control 108. In some embodiments, the computing device 110 provides data storage, data retrieval, and/or data processing operations, e.g., to reduce the processing power and/or data storage requirements of the movable platform 102 and/or the remote control 108. For example, the computing device 110 is communicatively connected to a database and/or the computing device 110 includes a database. In some embodiments, the computing device 110 is used in lieu of or in addition to the remote control 108 to perform any of the operations described with regard to the remote control 108.

In some embodiments, the movable platform 102 communicates with a remote control 108 and/or a computing device 110, e.g., via wireless communications 112. In some embodiments, the movable platform 102 receives information from the remote control 108 and/or the computing device 110. For example, information received by the movable platform 102 includes, e.g., control instructions for controlling movable platform 102. In some embodiments, the movable platform 102 transmits information to the remote control 108 and/or the computing device 110. For example, information transmitted by the movable platform 102 includes, e.g., images and/or video captured by the movable platform 102.

In some embodiments, communications between the computing device 110, the remote control 108 and/or the movable platform 102 are transmitted via a network (e.g., Internet 116) and/or a wireless signal transmitter (e.g., a long range wireless signal transmitter) such as a cellular tower 118. In some embodiments, a satellite (not shown) is a component of Internet 116 and/or is used in addition to or in lieu of the cellular tower 118.

In some embodiments, information communicated between the computing device 110, the remote control 108 and/or the movable platform 102 include control instructions. Control instructions include, e.g., navigation instructions for controlling navigational parameters of the movable platform 102 such as position, orientation, orientation, and/or one or more movement characteristics of the movable platform 102, the carrier 104, and/or the payload 106. In some embodiments, control instructions include instructions directing movement of one or more of the movement mechanisms 114. For example, control instructions are used to control flight of a UAV.

In some embodiments, control instructions include information for controlling operations (e.g., movement) of the carrier 104. For example, control instructions are used to control an actuation mechanism of the carrier 104 so as to cause angular and/or linear movement of the payload 106 relative to the movable platform 102. In some embodiments, control instructions adjust movement of the carrier 104 relative to the movable platform 102 with up to six degrees of freedom.

In some embodiments, control instructions are used to adjust one or more operational parameters for the payload 106. For example, control instructions include instructions for adjusting an optical parameter (e.g., an optical parameter of the imaging device 216). In some embodiments, control instructions include instructions for adjusting imaging properties and/or image device functions, such as capturing an image, initiating/ceasing video capture, powering an imaging device 216 on or off, adjusting an imaging mode (e.g., capturing still images or capturing video), adjusting a distance between left and right components of a stereographic imaging system, and/or adjusting a position, orientation, and/or movement (e.g., pan rate, pan distance) of a carrier 104, a payload 106 and/or an imaging device 216.

In some embodiments, when control instructions are received by movable platform 102, the control instructions change parameters of and/or are stored by memory 204 (FIG. 2A) of movable platform 102.

In some embodiments, the movable platform 102 includes movement mechanisms 114 (e.g., propulsion mechanisms). Although the plural term "movement mechanisms" is used herein for convenience of reference, "movement mechanisms 114" refers to a single movement mechanist (e.g., a single propeller) or multiple movement mechanisms (e.g., multiple rotors). The movement mechanisms 114 include one or more movement mechanism types such as rotors, propellers, blades, engines, motors, wheels, axles, magnets, nozzles, and so on. The movement mechanisms 114 are coupled to the movable platform 102 at, e.g., the top, bottom, front, back, and/or sides. In some embodiments, the movement mechanisms 114 of a single movable platform 102 include multiple movement mechanisms of the same type. In some embodiments, the movement mechanisms 114 of a single movable platform 102 include multiple movement mechanisms with different movement mechanism types.

Figure 2A:
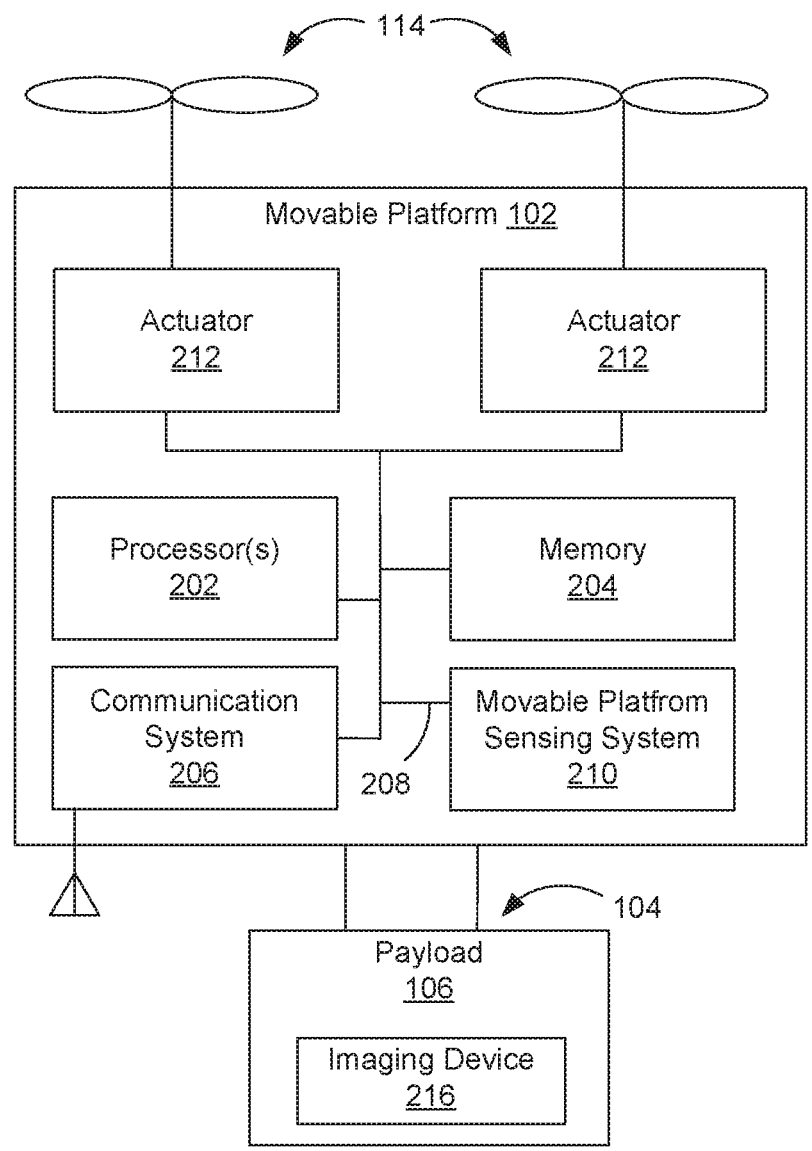
FIG. 2A illustrates a movable platform, in accordance with some embodiments.

FIG. 2A illustrates an exemplary movable platform 102, in accordance with some embodiments. The movable platform 102 typically includes one or more processor(s) 202, a memory 204, a communication system 206, a movable platform sensing system 210, and one or more communication buses 208 for interconnecting these components.

In some embodiments, the movable platform 102 is a UAV and includes components to enable flight and/or flight control. In some embodiments, the movable platform 102 includes communication system 206 with one or more network or other communications interfaces (e.g., via which flight control instructions are received), one or more movement mechanisms 114, and/or one or more movable platform actuators 212 (e.g., to cause movement of movement mechanisms 114 in response to received control instructions). Although the movable platform 102 is depicted as an aircraft, this depiction is not intended to be limiting, and any suitable type of movable platform can be used. Actuator 212 is, e.g., a motor, such as a hydraulic, pneumatic, electric, thermal, magnetic, and/or mechanical motor.

The movement mechanisms 114 are coupled to the movable platform 102 using any suitable means, such as support elements (e.g., drive shafts) and/or other actuating elements (e.g., the movable platform actuators 212). In some embodiments, a movable platform actuator 212 receives control signals from the processor(s) 202 (e.g., via the control bus 208) that activates the movable platform actuator 212 to cause movement of a movement mechanism 114 (e.g., one or more propellers). For example, the processor(s) 202 include an electronic speed controller that provides control signals to a movable platform actuator 212.

In some embodiments, the movement mechanisms 114 enable the movable platform 102 to take off vertically from a surface or land vertically on a surface without requiring any horizontal movement of the movable platform 102 (e.g., without traveling down a runway). In some embodiments, the movement mechanisms 114 are operable to permit the movable platform 102 to hover in the air at a specified position and/or orientation. In some embodiments, one or more of the movement mechanisms 114 are controllable independently of one or more of the other movement mechanisms 114. For example, when the movable platform 102 is a quadcopter, each rotor of the quadcopter is controllable independently of the other rotors of the quadcopter. In some embodiments, multiple movement mechanisms 114 are configured for simultaneous movement.

In some embodiments, the movement mechanisms 114 include multiple rotors that provide lift and/or thrust to the movable platform 102. The multiple rotors are actuated to provide, e.g., vertical takeoff, vertical landing, and hovering capabilities to the movable platform 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of the movable platform 102 (e.g., with respect to up to three degrees of translation and/or up to three degrees of rotation).

In some embodiments, the memory 204 stores one or more instructions, programs (e.g., sets of instructions), modules, controlling systems and/or data structures, collectively referred to as "memory elements" herein. One or more memory elements described with regard to the memory 204 are optionally stored by the remote control 108, the computing device 110, and/or another device. In some embodiments, imaging device 216 includes memory that stores one or more parameters described with regard to the memory 204, such as intrinsic parameters (e.g., focal lengths, zooming information) and/or extrinsic parameters (e.g., position and/or orientation angles) of the imaging device 216.

In some embodiments, the memory 204 stores a controlling system configuration that includes one or more system settings (e.g., as configured by a manufacturer, administrator, and/or user). For example, identifying information for the movable platform 102 is stored as a system setting of the system configuration. In some embodiments, the controlling system configuration includes a configuration for the imaging device 216. The configuration for the imaging device 216 stores imaging property parameters (or intrinsic parameters) such as, zoom level and/or focus parameters (e.g., amount of focus, selecting autofocus or manual focus, and/or adjusting an autofocus target in an image). The imaging device configuration may also include image property parameters such as image resolution, image size (e.g., image width and/or height), aspect ratio, pixel count, quality, focus distance, depth of field, exposure time, shutter speed, and/or white balance. The configuration for the imaging device 216 may further include extrinsic parameters, such as position and/or orientation angles of the imaging device 216. In some embodiments, parameters stored by the imaging device configuration are updated in response to control instructions (e.g., generated by processor(s) 202 and/or received by the movable platform 102 from remote control 108 and/or the computing device 110). In some embodiments, parameters stored by the imaging device configuration are updated in response to information received from the movable platform sensing system 210 and/or the imaging device 216.

In some embodiments, a controlling system (not shown) includes an imaging device adjustment module configured to adjust an imaging device. In some examples, the controlling system is located on the movable platform 102, such as inside the memory 204, or on the payload 106, such as inside the imaging device 216. The imaging device adjustment module stores, e.g., instructions for adjusting a distance between an image sensor and an optical device of an imaging device 216, and/or instructions for controlling an imaging device actuator. In some embodiments, one or more instructions for performing imaging device adjustment are stored in the memory 204.

In some embodiments, the controlling system performs an autofocus operation. For example, the autofocus operation is performed, e.g., periodically, when a device determines from image analysis that a focus level has fallen below a focus level threshold, in response a determination that movable platform 102 and/or an image subject (e.g., a target or a remote object) has moved by more than a threshold distance, and/or in response to user input. In some embodiments, user input (e.g., received at remote control 108 and/or computing device 110) initiates and/or adjusts an autofocus mode. In some embodiments, user input indicates one or more regions (e.g., in an image captured by imaging device 216, such as an image displayed by remote control 108 and/or computing device 110) to be used and/or prioritized for an autofocus operation. In some embodiments, the autofocus module generates control instructions for moving an optical device relative to an image sensor in accordance with an image distance value determined by an image distance determination module. In some embodiments, one or more instructions for performing an autofocus operation are stored in the memory 204.

In some embodiments, the controlling system performs image distance determination, e.g., to determine an object distance e.g., a distance between an object and the imaging device 216) and/or an image distance (e.g., a distance between a point corresponding to a pixel in the image and the imaging device 216) in accordance with the operations described herein. For example, the image distance determination module uses sensor data from one or more depth sensors and one or more orientation sensors of a movable platform to determine an image distance and generate a control instruction for moving an optical device relative to an image sensor in accordance with the determined image distance. In some embodiments, one or more instructions for performing image distance determination are stored in the memory 204.

The above identified controlling system, modules, and/or programs (e.g., sets of instructions) need not be implemented as separate software programs, procedures or modules, and thus various subsets of these modules may be combined or otherwise re-arranged in various embodiments, and stored in the memory 204. In some embodiments, the controlling system includes a subset of the modules and data structures identified above. Furthermore, the memory 204 may store additional modules and data structures not described above. In some embodiments, the programs, modules, and data structures stored in the memory 204, or a non-transitory computer readable storage medium of memory 204, provide instructions for implementing respective operations in the methods described below. In some embodiments, some or all of these modules may be implemented with specialized hardware circuits that subsume pail or all of the module functionality. One or more of the above identified elements may be executed by one or more processors 202 of the movable platform 102. In some embodiments, one or more of the above identified modules are stored on one or more storage devices of a device remote from the movable platform (such as memory of the remote control 108, the computing device 110, and/or the imaging device 216) and/or executed by one or more processors of a device remote from the movable platform 102 (such as processor(s) of the remote control 108, the computing device 110, and/or the imaging device 216).

The communication system 206 enables communication with the remote control 108 and/or the computing device 110, e.g., via wireless signals 112. The communication system 206 includes, e.g., transmitters, receivers, and/or transceivers for wireless communication. In some embodiments, the communication is one-way communication, such that data is only received by the movable platform 102 from the remote control 108 and/or the computing device 110, or vice-versa. In some embodiments, communication is two-way communication, such that data is transmitted in both directions between the movable platform 102 and the remote control 108 and/or the computing device 110. In some embodiments, the movable platform 102, the remote control 108, and/or the computing device 110 are connected to the Internet 116 or other telecommunications network, e.g., such that data generated by the movable platform 102, the remote control 108, and/or the computing device 110 is transmitted to a server for data storage and/or data retrieval (e.g., for display by a website).

Figure 2B:
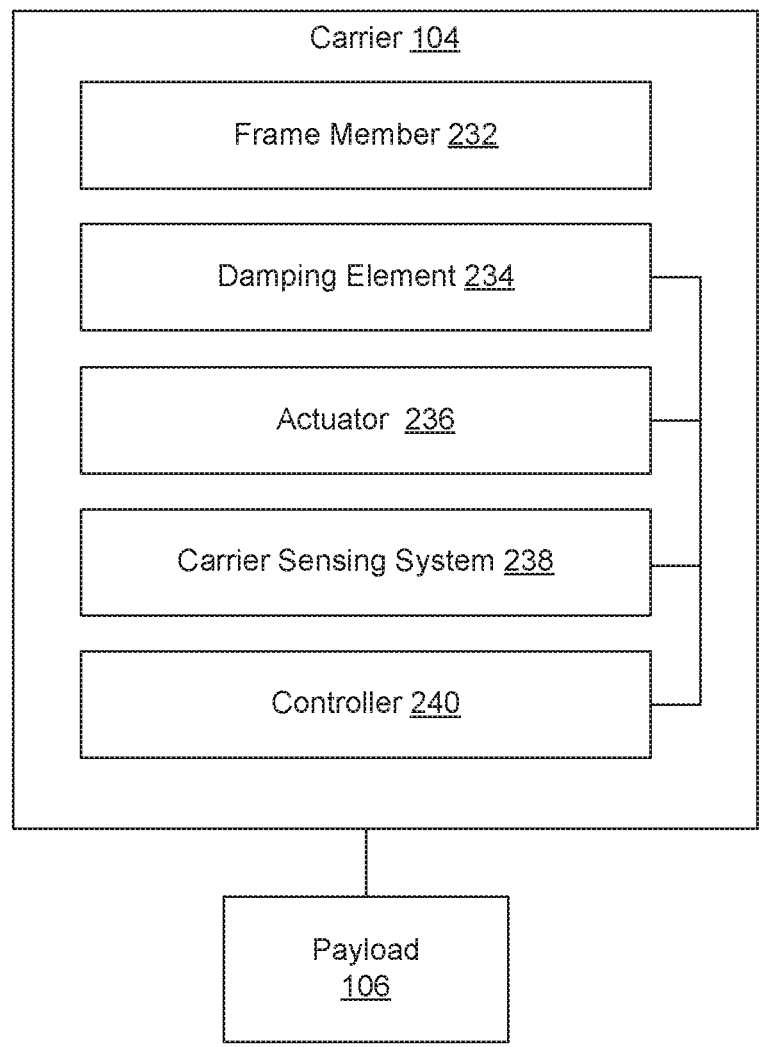
FIG. 2B illustrates an exemplary carrier of a movable platform, in accordance with embodiments.
Figure 2B:
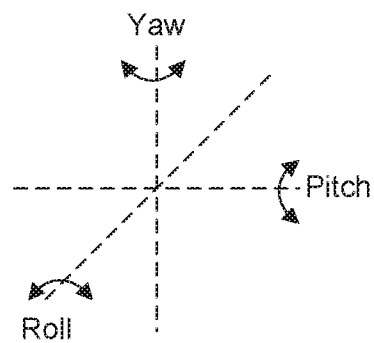
Figure 2C:
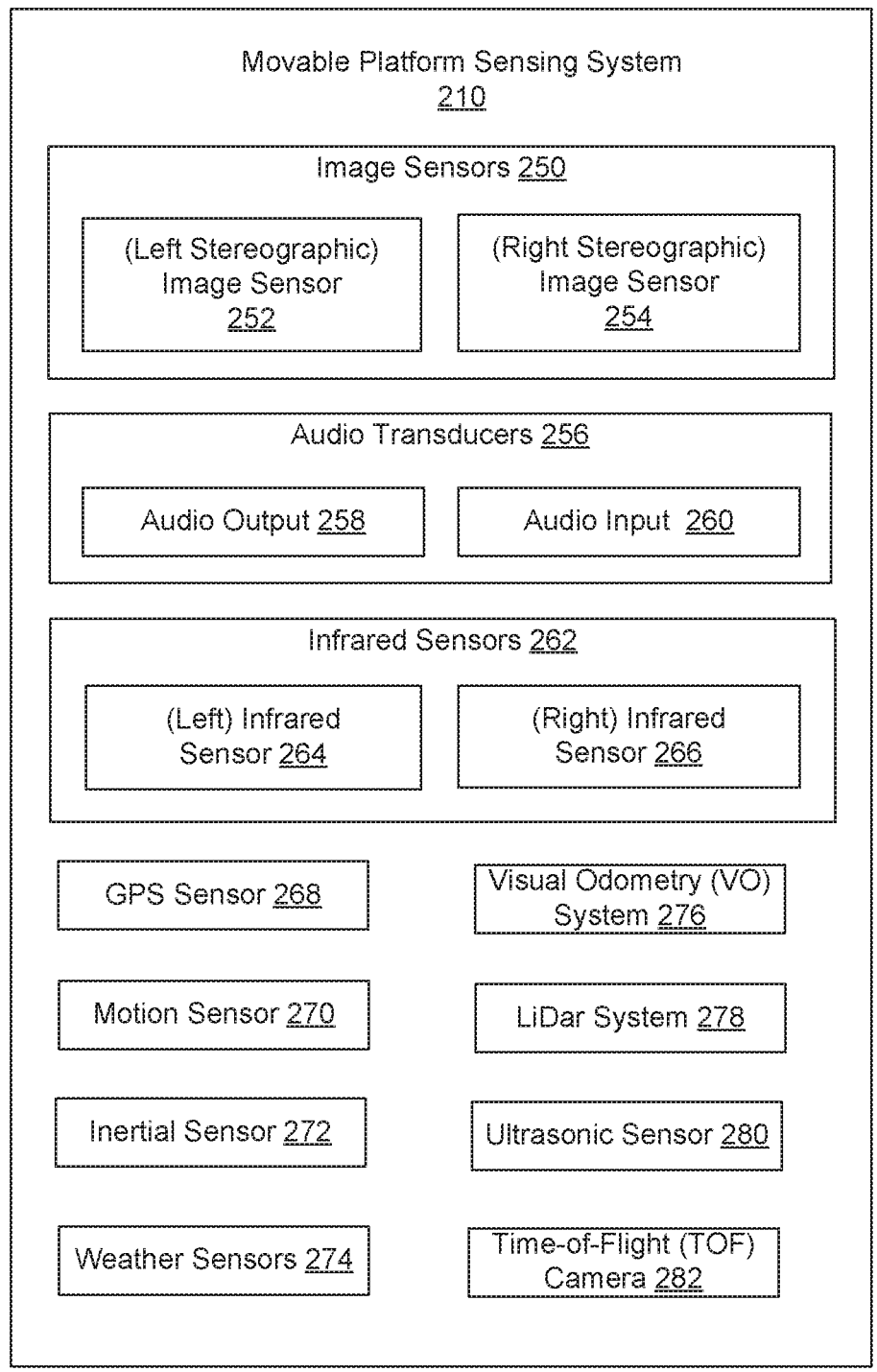
FIG. 2C illustrates an exemplary sensing system of a movable platform, in accordance with some embodiments.

In some embodiments, the sensing system 210 of the movable platform 102 includes one or more sensors, as described further with reference to FIG. 2C. In some embodiments, movable platform 102 and/or remote control 104 use sensing data generated by sensors of sensing system 210 to determine information such as a position of movable platform 102, an orientation of movable platform 102, movement characteristics of movable platform 102 (e.g., angular velocity, angular acceleration, translational velocity, translational acceleration and/or direction of motion along one or more axes), proximity of movable platform 102 to potential obstacles, weather conditions, locations of geographical features and/or locations of manmade structures.

FIG. 2B illustrates an exemplary carrier 104 in a movable platform environment 100, in accordance with embodiments. In some embodiments, carrier 104 couples a payload 106 to a movable platform 102.

In some embodiments, carrier 104 includes a frame assembly including one or more frame members 232. In some embodiments, frame member 232 is coupled with movable platform 102 and payload 106. In some embodiments, frame member 32 supports payload 106.

In some embodiments, carrier 104 includes one or mechanisms, such as one or more actuators 236, to cause movement of carrier 104 and/or payload 106. Actuator 236 is, e.g., a motor, such as a hydraulic, pneumatic, electric, thermal, magnetic, and/or mechanical motor. In some embodiments, actuator 236 causes movement of frame member 232. In some embodiments, actuator 236 rotates payload 106 about one or more axes, such as three axes: X axis ("pitch axis"), Z axis ("roll axis"), and Y axis ("yaw axis"), relative to movable platform 102. In some embodiments, actuator 236 translates payload 106 along one or more axes relative to movable platform 102.

In some embodiments, carrier 104 includes one or more carrier sensing system 238, e.g., for determining a state of carrier 104 or payload 106. Carrier sensing system 238 includes, e.g., motion sensors (e.g., accelerometers), rotation sensors (e.g., gyroscopes), potentiometers, and/or inertial sensors. In some embodiments, carrier sensing system 238 includes one or more sensors of movable platform sensing system 210 as described below with regard to FIG. 2C. Sensor data determined by carrier sensing system 238 includes, e.g., spatial disposition (e.g., position, orientation, or attitude) and/or movement information such as velocity (e.g., linear or angular velocity) and/or acceleration linear or angular acceleration) of carrier 104 and/or payload 106. In some embodiments, sensing data and/or state information calculated from the sensing data are used as feedback data to control the movement of one or more components (e.g., frame member 232, actuator 236, and/or damping element 234) of carrier 104. Carrier sensor 206 is coupled to, e.g., frame member 232, actuator 236, damping element 234, and/or payload 106. In an embodiment, a carrier sensor 238 (e.g., a potentiometer) measures movement of actuator 236 (e.g., the relative positions of a motor rotor and a motor stator) and generates a position signal representative of the movement of the actuator 236 (e.g., a position signal representative of relative positions of the motor rotor and the motor stator). In some embodiments, data generated by a carrier sensor 238 is received by processor(s) 116 and/or memory 204 of movable platform 102.

In some embodiments, the coupling of carrier 104 to movable platform 102 includes one or more damping elements 234. Damping elements 234 are configured to reduce or eliminate movement of the load (e.g., payload 106 and/or carrier 104) caused by movement of movable platform 102. Damping elements 234 include, e.g., active damping elements, passive damping elements, and/or hybrid damping elements having both active and passive damping characteristics. The motion damped by the damping elements 234 can include one or more of vibrations, oscillations, shaking, or impacts. Such motions may originate from motions of movable platform that are transmitted to the load. For example, the motion may include vibrations caused by the operation of a propulsion system and/or other components of a movable platform 102.

In some embodiments, a damping element 234 provides motion damping by isolating the load from the source of unwanted motion by dissipating or reducing the amount of motion transmitted to the load (e.g., vibration isolation). In some embodiments, damping element 234 reduces the magnitude (e.g., amplitude) of the motion that would otherwise be experienced by the load. In some embodiments the motion damping applied by a damping element 234 is used to stabilize the load, thereby improving the quality of images captured by the load (e.g., image capturing device), as well as reducing the computational complexity of image stitching steps required to generate a panoramic image based on the captured images.

Damping element 234 described herein can be formed from any suitable material or combination of materials, including solid, liquid, or gaseous materials. The materials used for the damping elements may be compressible and/or deformable. For example, the damping element 234 is made of, e.g. sponge, foam, rubber, gel, and the like. For example, damping element 234 includes rubber balls that are substantially spherical in shape. The damping element 234 is, e.g., substantially spherical, rectangular, and/or cylindrical. In some embodiments, damping element 234 includes piezoelectric materials or shape memory materials. In some embodiments, damping elements 234 include one or more mechanical elements, such as springs, pistons, hydraulics, pneumatics, dashpots, shock absorbers, isolators, and the like. In some embodiments, properties of the damping element 234 are selected so as to provide a predetermined amount of motion damping. In some instances, the damping element 234 has viscoelastic properties. The properties of damping element 234 are, e.g., isotropic or anisotropic. In some embodiments, damping element 234 provides motion damping equally along all directions of motion. In some embodiments, damping element 234 provides motion damping only along a subset of the directions of motion (e.g., along a single direction of motion). For example, the damping element 234 may provide damping primarily along the Y (yaw) axis. In this manner, the illustrated damping element 234 reduces vertical motions.

In some embodiments, carrier 104 includes controller 240. Controller 240 includes, e.g., one or more controllers and/or processors. In some embodiments, controller 240 receives instructions from processor(s) 116 of movable platform 102. For example, controller 240 is connected to processor(s) 202 via control bus 208. In some embodiments, controller 240 controls movement of actuator 236, adjusts one or more parameters of carrier sensor 238, receives data from carrier sensor 238, and/or transmits data to processor 202.

FIG. 2C illustrates an exemplary sensing system 210 of a movable platform 102, in accordance with some embodiments. In some embodiments, one or more sensors of the movable platform sensing system 210 are mounted to the exterior, located within, associated with, or otherwise coupled to the movable platform 102. In some embodiments, one or more sensors of the movable platform sensing system 210 are components of and/or coupled to the carrier 104 (e.g., FIG. 2B), the payload 106, and/or the imaging device 216. Where sensing operations are described herein as being performed by the movable platform sensing system 210, it will be recognized that such operations are optionally performed by one or more sensors of the carrier 104, the payload 106, and/or the imaging device 216 in addition to and/or in lieu of one or more sensors of the movable platform sensing system 210.

Movable platform sensing system 210 generates static sensing data (e.g., a single image captured in response to a received instruction) and/or dynamic sensing data (e.g., a series of images captured at a periodic rate, such as a video).

In some embodiments, movable platform sensing system 210 includes one or more image sensors 250, such as a pair of image sensors including a left stereographic image sensor 252 and a right stereographic image sensor 254. Image sensors 250 capture, e.g., images, image stream (e.g., videos), stereographic images, and/or stereographic image streams (e.g., stereographic videos). Image sensors 250 detect light, such as visible light, infrared light, and/or ultraviolet light. In some embodiments, movable platform sensing system 210 includes one or more optical devices (e.g., lenses) to focus or otherwise alter the light onto one or more image sensors 250. In some embodiments, image sensors 250 include, e.g., semiconductor charge-coupled devices (CCD), active pixel sensors using complementary metal-oxide-semiconductor (CMOS) or N-type metal-oxide-semiconductor (NMOS, Live MOS) technologies, or any other types of sensors. In some embodiments, an imaging system discussed in the present disclosure includes the image sensors 250, such as left stereographic image sensor 252 and right stereographic image sensor 254. In some embodiments, an imaging system discussed in the present disclosure includes a single imaging device, such as the imaging device 216.

In some embodiments, movable platform sensing system 210 includes one or more audio transducers 256. For example, an audio detection system includes audio output transducer 258 (e.g., a speaker), and audio input transducer 260 (e.g. a microphone, such as a parabolic microphone). In some embodiments, microphone and a speaker are used as components of a sonar system. In some embodiments, a sonar system is used to detect current location information of an object (e.g., an obstacle and/or a target) in the environment.

In some embodiments, movable platform sensing system 210 includes one or more infrared sensors 262. In some embodiments, a distance measurement system includes a pair of infrared sensors, e.g., infrared sensor 264 (such as a left infrared sensor) and infrared sensor 266 (such as a right infrared sensor) or another sensor or sensor pair. The distance measurement system can be used to measure a distance to an object in the environment (e.g., a target and/or an obstacle).

In some embodiments, a system to produce a depth map includes one or more sensors or sensor pairs of movable platform sensing system 210 (such as left stereographic image sensor 252 and right stereographic image sensor 254; audio output transducer 258 and audio input transducer 260; and/or left infrared sensor 264 and right infrared sensor 266. In some embodiments, a pair of sensors in a stereo data system (e.g., a stereographic imaging system simultaneously captures data from different positions. In some embodiments, a depth map is generated by a stereo data system using the simultaneously captured data. In some embodiments, a depth map is used for positioning and/or detection operations, such as detecting an obstacle, detecting current location information of an obstacle, detecting a target, and/or detecting current location information for a target.

In some embodiments, movable platform sensing system 210 further includes, but is not limited to, one or more global positioning system (GPS) sensors 268, motion sensors (e.g., accelerometers) 270, rotation sensors (e.g., gyroscopes) (not shown), inertial sensors 272, proximity sensors (e.g., infrared sensors 262), and/or weather sensors 274 (e.g., pressure sensor, temperature sensor, moisture sensor, and/or wind sensor), visual odometry (VO) system 276, Lidar system 278, ultrasonic sensor 280 (e.g., for proximity detection or long-distance detection, and time-of-flight (TOF) camera 282. In some embodiments, the movable platform sensing system 210 includes an inertial measurement unit (IMU) that may include one or more sensors, such as the motion sensors 270, the rotation sensors, and optionally magnetometers.

The VO system 276 can be used for estimating position, orientation, and/or motion of the movable platform 02 based on visual data captured by one or more image sensors of the VO system 276. In some embodiments, the VO system 276 includes one or more pairs of image sensors, and each pair of image sensors includes left and right stereoscopic image sensors that can provide depth information. In some other embodiments, the VO system 276 includes one or more single imaging sensors or one or more omnidirectional cameras.

In some embodiments, sensing data generated by one or more sensors of movable platform sensing system 210 and/or information determined using sensing data from one or more sensors of movable platform sensing system 210 are transmitted to remote control 108 (e.g., via communication system 206) for further processing. In some embodiments, such sensing data is processed by the processors 202 on board the movable platform 102. In some embodiments, data generated by one or more sensors of movable platform sensing system 210 and/or information determined using sensing data from one or more sensors of movable platform sensing system 122 is stored by memory 204 of the movable platform 102, memory of the remote control 108, and/or memory of the computing device 110.

Figure 3A:
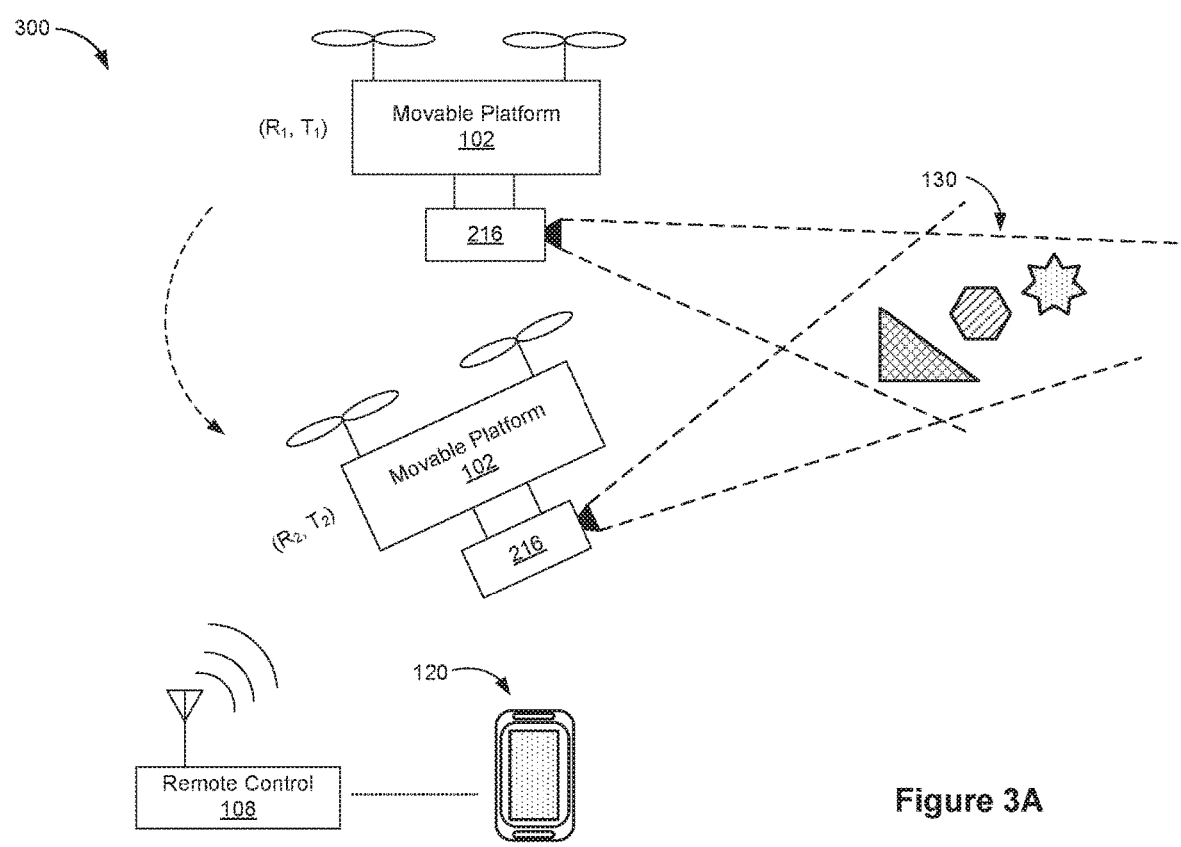
FIG. 3A illustrates a diagram for capturing one or more image frames using an imaging system of a movable platform when the imaging system is at different spatial configurations, in accordance with some embodiments.

FIG. 3A illustrates a diagram 300 for capturing one or more image frames using an imaging system when the imaging system is at different spatial configurations, in accordance with some embodiments. In some embodiments, the change of the spatial configuration for the imaging system (e.g., the imaging device 216 or the plurality of stereoscopic cameras 252 and 254) is due to a position and/or location change of the movable platform 102. In some embodiments, the spatial configuration comprises one or more extrinsic parameters, such as a position and/or orientation angles, of an imaging device. In some embodiments, the change of the spatial configuration for the imaging system, e.g., the imaging device 216, is due to a positional adjustment (e.g., rotation) of the carrier 104 for carrying the imaging device 216. In some embodiments, the imaging system comprises a single imaging device, such as imaging device 216, borne on the movable platform 102. For example, the imaging device 216 is borne on a movable platform, e.g., carrier 104, of the movable platform 102. In some embodiments, the imaging device 216 captures one or more image frames when the movable platform 102 or the movable platform is at different spatial configurations as shown in FIG. 3A. The captured image frame includes one or more objects, such as objects 130. Depth information of the one or more objects in the one or more image frames is obtained based on the spatial configurations of the imaging device 216.

In some embodiments, one or more sensors associated with the movable platform 102 are used to obtain the spatial configurations of the imaging system. The one or more sensors are selected from the sensing devices of the movable platform sensing system 210 and/or of the carrier sensing system 238. In some embodiments, the one or more sensors are configured to provide translational and/or rotational movement data of the imaging system. For example, the one or more sensors include at least an inertial measurement unit (IMU) associated with the movable platform 102 configured to provide the rotational movement data of the movable platform 102, such as yaw ($y_i$), pitch ($p_i$), roll angles ($r_i$) at a certain time point ($t_i$). The rotational movement data of the movable platform (or of the imaging system) may be further obtained by integrating the IMU data and data from the carrier sensing system 238. The one or more sensors may also include a GPS sensor configured to provide the translational movement data of the movable platform 102. In some embodiments, for each image frame, a set of spatial data including the translational and/or rotational movement data of the imaging device 216 at a specific moment when the corresponding image frame is captured is obtained from the one or more sensors.

As shown in FIG. 3A, in some embodiments, the movable platform 102 moves to two different spatial positions at respective time points, such as ($R_1$, $T_1$) at $t_1$ and ($R_2$, $T_2$) at $t_2$, where Ri is a rotational matrix and Ti a translational matrix that are used for illustrating a spatial configuration of the imaging device 216 at a moment i. In some embodiments, it is assumed that there is no relative movement between the imaging device 216 and the movable platform (or movable platform 102), thus Ri and Ti are used to indicate spatial configuration of the imaging device 216 at moment i within a coordinate system in which the movable platform 102 is situated. In some embodiments, there is relative movement between the imaging device 216 and the movable platform 102. For example, the position of the imaging device 216 is changed by adjusting the carrier 104 (FIG. 2B). The spatial configuration of the imaging device 216 is determined using sensor data from the movable platform sensing system 210 and the carrier sensing system 238. In some embodiments, the spatial configuration of the movable platform 102 and/or the imaging device 216 is adjusted by using the remote control 108, or an electronic device 120 communicably coupled to the remote control 108. In some embodiments, the spatial configuration of the movable platform 102 and/or the imaging device 216 is adjusted automatically by a predefined program, such as an auto-pilot program. In some embodiments, Ri is determined using sensor data obtained from BTU associated with the movable platform 102, and Ti is determined using sensor data obtained from GPS sensor 268 (FIG. 2C). The rotational and translational movement data are further used to determine the depth information of the one or more objects 130.

Figure 3B:
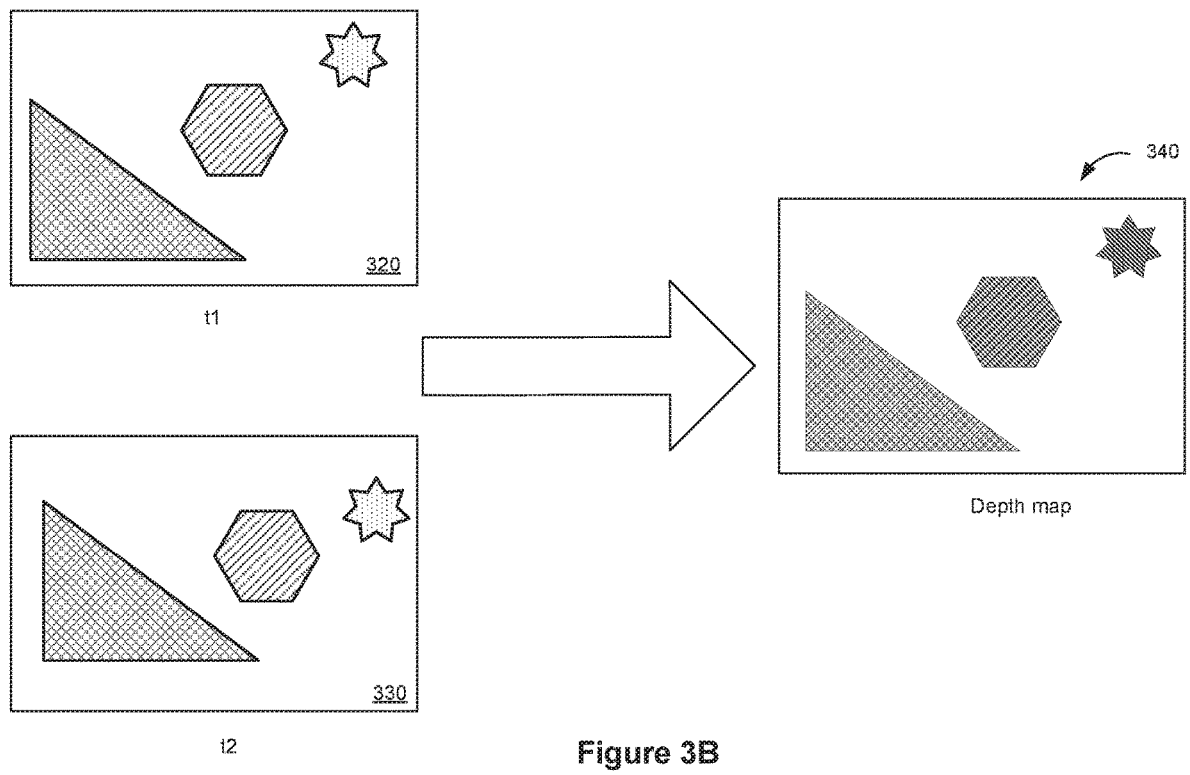
FIG. 3B illustrates a diagram for processing one or more image frames to obtain a depth map, in accordance with some embodiments.

FIG. 3B illustrates a diagram for processing one or more image frames (e.g., image frames 320 and 330) to obtain a depth map 340, in accordance with some embodiments. In some embodiments, the captured image frames 320 and 330 are transmitted from the movable platform 102 to the remote control 108 or the mobile device 120 for image processing. In some alternative embodiments, the captured image frames 320 and 330 are processed by an electronic device (e.g., processors 202) that is communicably coupled to the imaging device 216. The image frames 320 and 330 may correspond to a pair of stereo images perceived by left and right stereoscopic cameras. Each of the image frames 320 and 330 may be a 2-dimensional image including one or more identical objects that have different locations (e.g., coordinates) in respective image frames. The location difference (e.g., a lateral location difference) of an object in the image may be used for estimating a depth of the object in the real world coordinate relative to the imaging sensor(s).

In some embodiments referring to FIGS. 3A and 3B, Ri can be represented in equation (1) as:

$$R_i = \begin{bmatrix} \cos y_i \cos r_i & \sin r_i & -\sin y_i \cos r_i \\ -\cos y_i \sin r_i \cos p_i + \sin y_i \sin p_i & \cos p_i \cos r_i & \sin y_i \sin r_i \cos p_i + \sin p_i \cos y_i \\ \cos y_i \sin r_i \sin p_i + \sin y_i \cos p_i & -\cos r_i \sin p_i & -\sin y_i \sin r_i \sin p_i + \cos y_i \cos p_i \end{bmatrix} \quad (1)$$

$$i = 1, 2,$$

where ($y_i$, $p_i$, $r_i$) indicates yaw angle, pitch angle, and roll angle respectively of the imaging device 216. Thus a rotational matrix R' indicating a rotational movement of the imaging device 216 from moment $t_1$ to moment $t_2$ can be expressed in equation (2) as:

$$R' = R_2 R_1^{-1} \quad (2)$$

where ($y_i$, $p_i$, $r_i$) can be obtained from IMU, and Ti can be obtained from GPS sensor 268. Thus a translational matrix T' indicating a translational movement of the imaging device 216 from moment $t_1$ to moment $t_2$ can be expressed in equation (3) as:

$$T' = T_2 - R_2 R_1^{-1} T_1 \quad (3)$$

In some embodiments, an essential matrix E for relating corresponding characteristic points (e.g., characteristic pixels) between image frames captured between two moments can be expressed in equation (4) as:

$$\begin{cases} (K^{-1} x_2)^T E K^{-1} x_1 = 0 \\ E \approx \hat{T}^T R' = E' \end{cases} \quad (4)$$

where $x_1$ and $x_2$ are corresponding characteristic points in respective image frames (e.g., image frames 320 and 330), and E' is an approximate value of the essential matrix E detected by a matching process. In some embodiments, the matching process for detecting the corresponding characteristic points in respective image frames further includes determining characteristic point sets for image frames 320 and 330 respectively. For example, a characteristic point set $I_1$ is detected for image frame 320, and a corresponding characteristic point set $I_2$ is detected for image frame 330 using point matching technique, object matching, and/or area matching between the image frames 320 and 330. In some embodiments, for a respective characteristic point $x_1$ in the characteristic point set $I_1$ from image frame 320, an approximate characteristic point $x_2'$ can be determined from the characteristic point set $I_2$ in image frame 330 using $(K^{-1} x_2)^T E K^{-1} x_1 = 0$ from equation (4). Then from the characteristic point set $I_2$, among all the contiguous characteristic points within a predefined region from the approximate characteristic point $x_2'$, a most similar characteristic point $x_2''$ that has the highest similarity to the characteristic point $x_1$ can be determined using a similarity matching algorithm, such as vector similarity calculation. The matching process further repeats the above one or more steps to determine a most similar characteristic point for each characteristic point in the characteristic point set $I_1$. A characteristic point pair set M includes all the pairs of characteristic points $(x_1, x_2'')$ that are most similar to each other as expressed in equation (5) as:

$$M=\{(x_1, x_2'')|(K^{-1}x_2'')^T E K^{-1}x_1 \approx 0, x_1 \in I_1, x_2'' \in I_2\} \quad (5)$$

In some embodiments, an optimized essential matrix E is determined using an optimization process based on an intrinsic parameter matrix K of the imaging device 216 and the characteristic point set M determined in equation (5). For example, the optimized essential matrix E is determined using equation (6) as follows:

$$\begin{cases} (K^{-1}x_2)^T E K^{-1}x_1 = 0 \\ (x_1, x_2) \in M \end{cases} \quad (6)$$

Furthermore, an optimized rotational matrix R and an optimized translational matrix T are determined based on the optimized essential matrix E using equation (7) as follows:

$$E = \hat{T}^T R \quad (7)$$

In some embodiments, a set N comprising all corresponding characteristic points (or pixels) $(u_1, u_2)$ between image frame 320 and image frame 330 is determined based on the optimized essential matrix E by equation (8) as follows:

$$N=\{(u_1, u_2)|(K^{-1}u_2)^T E K^{-1}u_1 \approx 0, u_1 \in P_1, u_2 \in P_2\}, \quad (8)$$

where $P_1$ is a set including all (e.g., each and every pixel) pixels (e.g., points) image frame 320 and $P_2$ is a set including all pixels (e.g., each and every pixel) in image flame 330.

In some embodiments, depth information for the corresponding characteristic points $(u_1, u_2)$ between image frame 320 and image frame 330 can be further determined based on the optimized rotational matrix R and the optimized translational matrix T. For example, the depth information includes a 3-dimensional coordinate X for a common characteristic point from image frame 320 and image frame 330. In some embodiments, the 3-dimensional coordinate X be determined by equation (9) as follows:

$$\begin{cases} \widehat{u_1} K X = 0 \\ \widehat{u_2} K R X = -\widehat{u_2} T \end{cases} \quad (9)$$

where the 3-dimensional coordinate X uses a coordinate system of the imaging device 216 in image frame 320. In some embodiments, the 3-dimensional coordinate is related to a 3-dimensional distance between an object correlated to the point/pixel and the imaging system.

In some embodiments, the depth information of one or more objects in an image frame captured by the imaging system is determined by sensor data obtained from the VO system 276. For example, the VO system 276 can provide motion information of the imaging system, such as position, orientation, and/or motion of the movable platform 102 based on visual data captured by one or more image sensors of the VO system 276. The VO system 276 may include one or more pairs of stereoscopic image sensors that can provide depth information of the one or more objects captured by the stereoscopic image sensors.

In some embodiments, the depth information of one or more objects in an image frame captured by the imaging system is determined by a depth sensor associated with the movable platform 102. The depth sensor can include a range imaging camera, such as the TOF camera 282. The TOF camera calculates a distance of each point/pixel in the image frame based on the speed of light. For example, the time-of-flight of a light signal between the imaging system and the subject for a pixel in the image frame is measured to determine the distance of the corresponding pixel. In some embodiments, when the depth sensor is used for determining the depth information, a single image frame may be used.

In some embodiments, the imaging system comprises a pair of stereoscopic imaging devices, such as stereoscopic image sensors 252 and 254 of FIG. 2C, for capturing a pair of stereoscopic image frames including one or more objects. The depth information of the one or more objects can be determined based on disparity values calculated based on the pair of stereoscopic image frames. In some embodiments, the spatial configuration of the imaging system (e.g., the pair of stereoscopic image sensors 252 and 254) includes a distance between the pair of stereoscopic imaging devices. For example, the depth information for each object is determined based on the disparity values of pixels of the object between the pair of stereoscopic image frames, the distance between the pair of stereoscopic imaging devices, and the focal length of one or more stereoscopic imaging sensors for capturing the stereoscopic image frames.

A depth map, e.g., depth map 340 of FIG. 3B, includes depth information, such as disparity values (not shown), for one or more objects in the depth map. In some embodiments, the depth map shows luminance in proportion to the distance from the camera or from a focal plane in the image. For example, portions of the depth map that are closer to the camera or to the focal plane are darker, and portions of the depth map that are farther from the camera or from the focal plane are lighter. One or more rendering parameters associated with each object are calculated based on the respective depth information. An image frame is rendered using the rendering parameters to achieve selective focusing effect. In some embodiments, the image frame is selected from the one or more image frames captured for determining depth information, such as stereoscopic image frame 320 or 330 as discussed with reference to FIGS. 3A-3B. In some embodiments, the image frame is an image frame (e.g., a stereoscopic image or an image captured by the imaging device 216) subsequent to the one or more image frames 320 and 330. The depth information in the image frame can be estimated based on the depth information determined in one or more image frames 320 and 330. In some embodiments, the image frame is a panorama view stitched from a set of image frames captured by the imaging system. In some embodiments, one or more sets of pixels, one or more regions, one or more layers, or one or more objects within the image frame are rendered using rendering parameters determined based on the corresponding depth information. In some examples, the image frame is grouped into a plurality of layers $(l_1, l_2, \ldots l_{n-1}, l_n)$ based on depth information of the respective objects. In some embodiments, multiple sets of pixels, multiple regions, or multiple layers may overlap between the neighboring areas. The overlapped areas may be processed to have a smooth transitional effect.

Figure 4A:
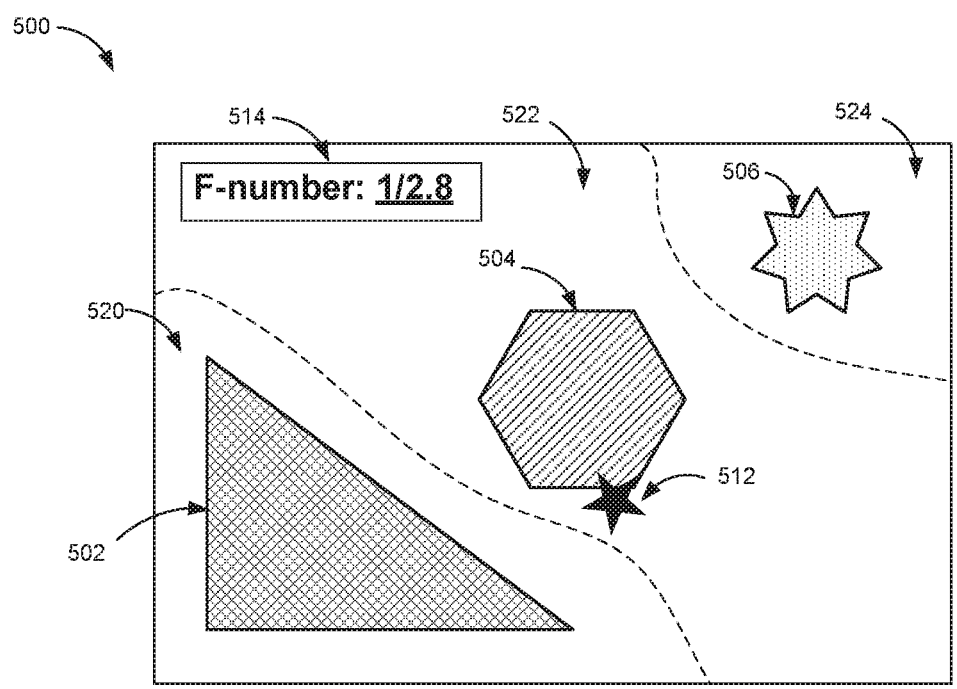
FIG. 4A is an exemplary diagram illustrating user interactions with an image frame for adjusting image focus, in accordance with some embodiments.

FIG. 4A is an exemplary diagram illustrating user interactions with an image frame 500 for adjusting image focus, in accordance with some embodiments. In some embodiments, image frame 500 is selected from the one or more image frames captured for determining depth information, such as stereoscopic image frame 320 or 330 as discussed with reference to FIGS. 3A-3B. In some embodiments, image frame 500 is an image frame captured by the imaging device 216. In some embodiments, after the image frame 500 is captured by the imaging system, the image frame 500 is transmitted to an electronic device, such as the remote control 108 or a mobile device 120 coupled to the remote control 108 (FIG. 3A), for display to a user controlling and/or monitoring the movable platform 102. The image frame 500 includes one or more objects, such as objects 502, 504, and 506. In some embodiments, the electronic device determines depth information of the objects 502, 504, and 506 in image frame 500 based on spatial configuration of the imaging system. In some embodiments, the electronic device groups the one or more objects into a plurality of layers based on the depth information of respective objects.

In some embodiments, the remote control 108 or the mobile device 120 includes user interface components that facilitate user interactions with the image frame 500 such as a keyboard, a mouse, a voice-command input unit or microphone, a touch screen display, a touch-sensitive input pad, a camera, a gesture capturing camera, or other input buttons or controls. In some embodiments, an object, such as object 504, is selected from the one or more objects in image frame 500 by a user interaction. In some examples, the user selects object 504 using a mouse click on the display, a finger gesture 512 on the touch screen of the display, or an audio command through a speaker of the remote control 108 or the mobile device 120. In some other examples, the user inputs an aperture parameter, such as an F-number 514, as shown in FIG. 4A.

In some embodiments, the user interaction 512 with object 504 or a user input 514 of a specific aperture parameter may indicate an intention to have object 504 included in the in-focus region 522. In response to the user interaction 512 or 514, the electronic device determines one or more rendering parameters for rendering the plurality of layers based on depth information of objects 502, 504, and 506 respectively. In some embodiments, a depth range of the image frame is determined based on a distance between the nearest object and the farthest object in the image frame, and the depth range is divided into multiple smaller ranges evenly. Each layer is associated with a division, and the depth information of each layer can be determined to be associated with an average depth of all pixels in each division or a depth of one or more representative pixels (such as a distinctive object) in each division. In some embodiments, each layer of the image frame is determined to include a complete object. The depth information associated with each layer can be determined based on the depth information of the corresponding object included therein.

Figure 4B:
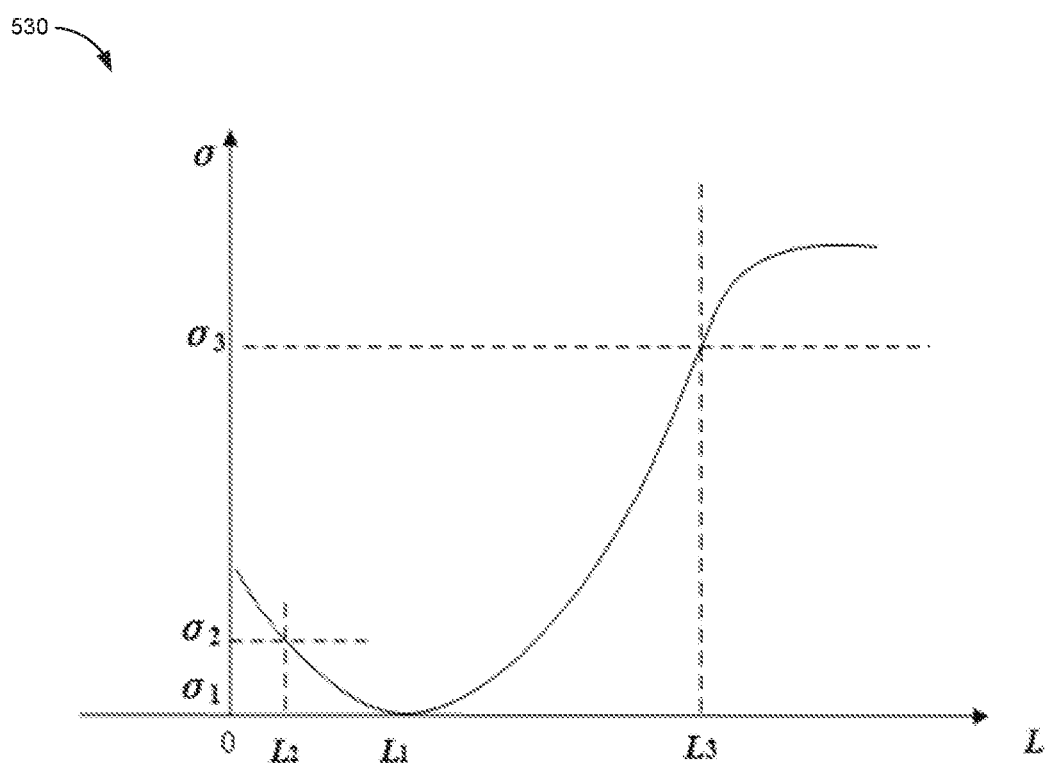
FIG. 4B illustrates an exemplary diagram for determining rendering parameters for a plurality of layers within an image frame, in accordance with some embodiments.

FIG. 4B illustrates an exemplary diagram (e.g., σ-L curve 530, where L is a distance between an object and the imaging system, and σ is a rendering parameter such as a diameter of the circle of confusion) for determining a plurality of rendering parameters for a plurality of layers $l_1$, $l_2$, ... $l_{n-1}$, $l_n$ respectively within an image frame, in accordance with some embodiments. In some examples, a σ-L curve (e.g., FIG. 4B) is determined in response to the user interaction 512 or 514 to have object 512 included in an in-focus region of the image frame 500. In some embodiments, depth-of-field (DOF) parameters, such as $\Delta L_1$, $\Delta L_2$, and $\Delta L$, are determined based on intrinsic parameters of the imaging system and the DOF relation (e.g., equation (10)). In some embodiments, the rendering parameters are calculated based on the depth information associated with the respective layers. In some embodiments, one or more layers of the image frame are rendered using Gaussian blurring by convolving different regions of the image frame corresponding to the different layers with a Gaussian function. As shown in FIG. 4B, different rendering parameters $\sigma_1$, $\sigma_2$, $\sigma_3$ are used for processing respective layers $L_1$, $L_2$, and $L_3$ respectively. For example, a rendering parameter is the standard deviation of the Gaussian distribution. The rendering parameters $\sigma_1$, $\sigma_2$, $\sigma_3$ are determined based on the respective depth information of the corresponding layers. For example, as shown in FIG. 4B, if layer $L_1$ is selected to be an in-focus layer associated with rendering parameter $\sigma_1$. Layers $L_2$ and $L_3$ are processed to be out-of-focus regions separately using respective rendering parameters $\sigma_2$ and $\sigma_3$. In some embodiments, a region may include one or more layers. It is to be understood that the multiple layers as illustrated in FIG. 4B are examples of how to determine rendering parameters of an image frame. Other suitable methods may be used for determining rendering parameters of different portions of an image frame. In some examples, the image frame is grouped into a plurality of layers ($l_1$, $l_2$, ... $l_{n-1}$, $l_n$) based on depth information of the respective objects. In other examples, the image frame is grouped into a plurality of regions, a plurality sets of pixels, etc. In some embodiments, multiple sets of pixels, multiple regions, or multiple layers may overlap between the neighboring areas. The overlapped areas may be processed to have a smooth transitional effect.

In some embodiments, after an image frame (e.g., image frame 500, FIG. 4A) is captured by the imaging system, a user selects (512) an object or inputs (514) an aperture parameter. A corresponding σ-L curve, such as σ-L curve 530 as shown in FIG. 4B, can be determined. In some embodiments, layer $L_1$ of FIG. 4B corresponds to an in-focus region (e.g., region 522) in the image frame that appears to be clear/sharp and not blurry to a human eye, and layers $L_2$ (e.g., region 520) and $L_3$ (e.g., region 524) correspond to the out-of-focus regions in the image frame that appear to be blurry to the human eye. Layer $L_1$ has a depth of field (DOF) that corresponds to one or more points/pixels of the in-focus region that are precisely focused by the lens and other points/pixels contiguous to the points/pixels that appear to be sharp to the human eye. The DOF can be determined based on the intrinsic parameters of the imaging system in the following equation (10):

$$\Delta L_1 = \frac{F\sigma L^2}{f^2 + F\sigma L} \quad (10)$$

$$\Delta L_2 = \frac{-F\sigma L^2}{f^2 - F\sigma L}$$

$$\Delta L = \frac{2f^2 F\sigma L^2}{f^4 - F^2\sigma^2 L^2},$$

Where $\Delta L_1$ is a distance between the on-focus points and the nearest points relative to the imaging system in layer 522, $\Delta L_2$ is a distance between the on-focus points and the farthest points relative to the imaging system in layer 522, $\Delta L$ is a distance between the farthest points and the nearest points in layer 522. Layer 522 corresponds to rendering parameter $\sigma_1$. Furthermore, in equation (10), L is a distance between object 504 and the imaging system, f is a focal length of the imaging system, F is an aperture parameter of the imaging system such as an f-number of the aperture (a ratio between the focal length and a diameter of the aperture), and σ is a diameter of the circle of confusion. In some embodiments, once an in-focus object is selected or an aperture parameter is inputted by the user, the DOF and the in-focus region are determined.

In some embodiments, image frame 500 includes a plurality of layers. In response to the user interaction 512 or 514, it is determined that layer $l_i$ includes pixels on focus. Based on the calculated DOF parameters, it is determined that layers $l_{i-m}$~$l_i$ are included in the in-focus region 522 corresponding to $\Delta L_1$, and layers $l_i$~$l_{i+n}$ are also included in the in-focus region 522 corresponding to $\Delta L_2$. Thus layers $l_{i-m}$~$l_{i+n}$ are determined to be the in-focus region 522 corresponding to $\Delta L$ (e.g., the DOF). Layers $l_1, l_2, \ldots, l_{i-m-1}$ correspond to an out-of-focus region 520 including pixels representing objects that are nearer to the imaging system compared to pixels of layers $l_{i-m}$~$l_{i+n}$. Layers $l_{i+n+1}, l_{i+n+2}, \ldots l_j$ correspond to an out-of-focus region 524 including pixels representing objects that are farther from the imaging system compared to pixels of layers $l_{i-m}$~$l_{i+n}$. In some embodiments, pixels on layers $l_{i-m}$~$l_{i+n}$ (e.g., in-focus region 522) including the object 504 are unchanged (e.g., $\sigma_{i-m}$~$\sigma_{i+n}$ are zero), and pixels on layers $l_1, l_2, \ldots l_{i-m-1}$ and layers $l_{i+n+1}, l_{i+n+2}, \ldots l_j$ are rendered using rendering parameters $\sigma_1, \sigma_2, \ldots \sigma_{i-m-1}$ and $\sigma_{i+n+1}, \sigma_{i+n+2}, \ldots \sigma_j$ respectively. In some embodiments, layers $l_1, l_2, \ldots, l_{i-m-1}$ are rendered using the rendering parameters with a relationship such as $\sigma_1 > \sigma_2 > \ldots > \sigma_{i-m-1}$, and layers $l_{i+n+1}, \ldots, l_{j-1}, l_j$ are rendered using the rendering parameters with a relationship such as $\sigma_{i+n+1} < \ldots < \sigma_{j-1} < \sigma_j$. In some embodiments, the transitions among the plurality of layers are further smoothed using suitable image smoothing algorithms.

Figure 5:
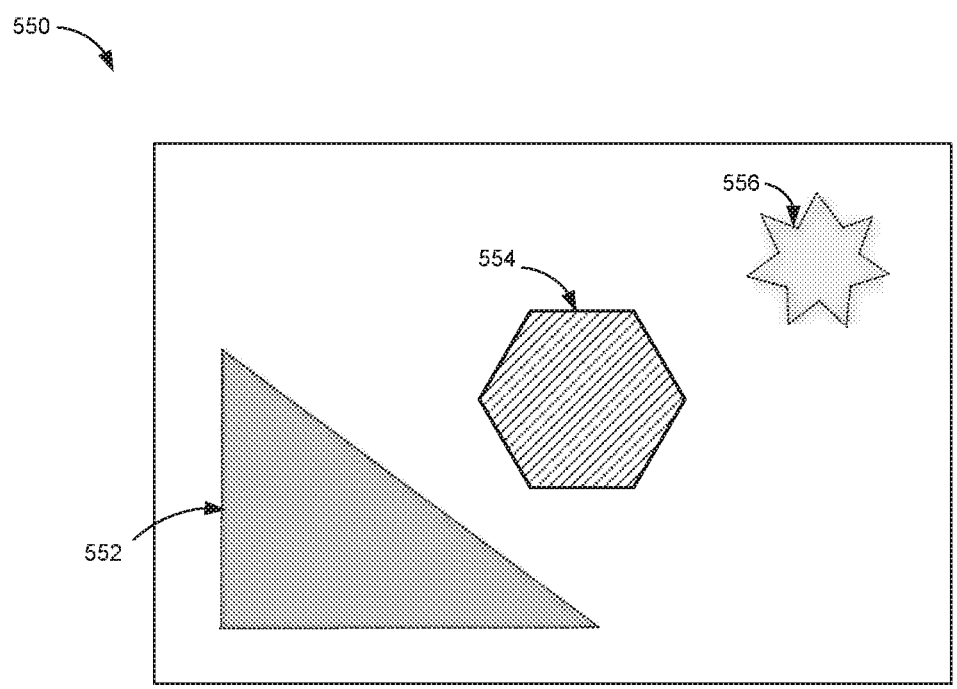
FIG. 5 illustrates an exemplary diagram for a rendered image frame with adjusted image focus, in accordance with some embodiments.

FIG. 5 illustrates an exemplary diagram for a rendered image frame 550 with adjusted image focus, in accordance with some embodiments. In some embodiments as shown in FIG. 5, a processed (e.g., rendered) image 550 is obtained using the one or more rendering parameters determined using the σ-L curve 530 as discussed with reference to FIG. 4B. After processing, object 554 appears to be sharp and clear to the human eye, and objects 552 and 556 appear to be blurry to the human eye. In FIG. 5, objects 552 and 556 are illustrated in dashed lines to reflect the blurry effect.

Figure 6A:
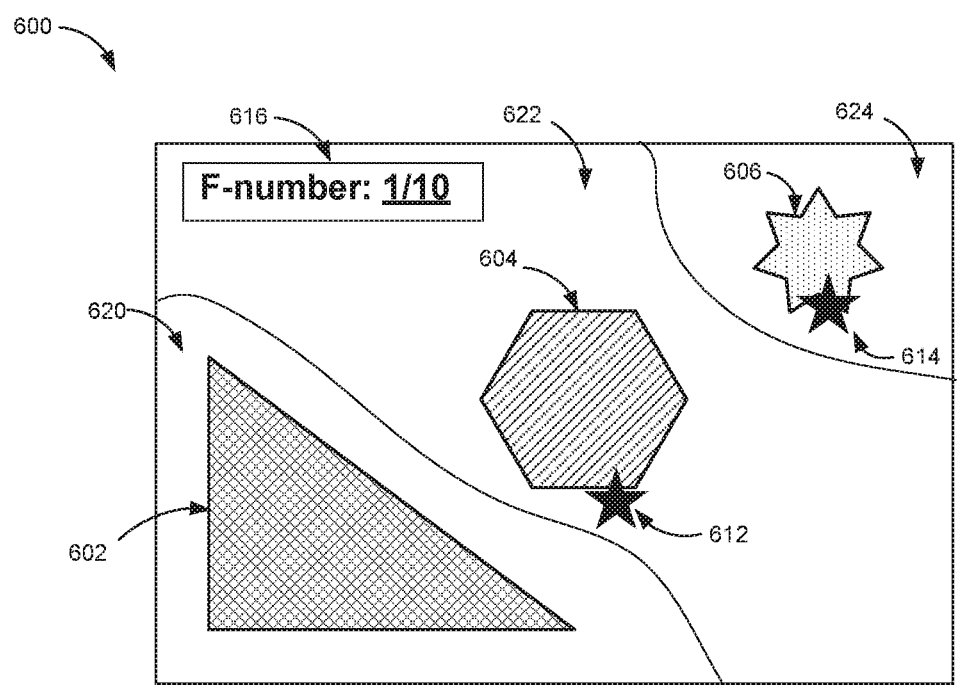
FIG. 6A is an exemplary diagram illustrating user interactions with an image frame for adjusting image focus, in accordance with some embodiments.

FIG. 6A is an exemplary diagram illustrating user interactions with an image frame 600 for adjusting image focus, in accordance with some embodiments. In some embodiments, image frame 600 is selected from the one or more image frames captured for determining depth information, such as image frames 320 and 330 as discussed with reference to FIGS. 3A-3B. In some embodiments, image frame 600 is an image frame subsequent to the one or more image frames 320 and 330. In some embodiments, after the image frame 600 is captured by the imaging system, the image frame 600 is transmitted to an electronic device, such as the remote control 108 or the mobile device 120, for display to a user controlling and/or monitoring the movable platform 102. The image frame 600 includes one or more objects, such as objects 602, 604, and 606. In some embodiments, the electronic device determines depth information of the objects 602, 604, and 606 in image frame 600 based on spatial configuration of the imaging system. The electronic device groups the one or more objects into a plurality of layers based on the depth information of respective objects as discussed with reference to FIG. 4A.

In some embodiments, user interaction 612 with object 604 and user interaction 614 with object 606, or a user input 616 of a specific aperture parameter is received at the electronic device for adjusting image focus. The user interaction 612 and 614 or user input 616 may indicate an intention to have objects 604 and 606 included in out-of-focus regions 622 and 624, and object 602 included in an in-focus region 620. In response to the user interaction 612 and 614 or user input 616, a σ-L curve (a different σ-L curve from FIG. 4B) is determined, and one or more rendering parameters are calculated based on depth information of objects 602, 604, and 606 respectively. DOF parameters, such as $\Delta L_1$, $\Delta L_2$, and $\Delta L$, are also determined based on intrinsic parameters of the imaging system and the DOF equation (10). In some embodiments, the rendering parameters for one or more layers in in-focus region 620 is zero, and the one or more rendering parameters determined for layers in out-of-focus regions 622 and 624 increase as a distance of a corresponding layer is farther from the imaging system. In some embodiments, rendering parameters for layers (not shown) in out-of-regions that are nearer to the imaging system than the in-focus region 620 increase as a distance of a corresponding layer is nearer to the imaging system. In some embodiments, the transitions among the plurality of layers are further smoothed.

Figure 6B:
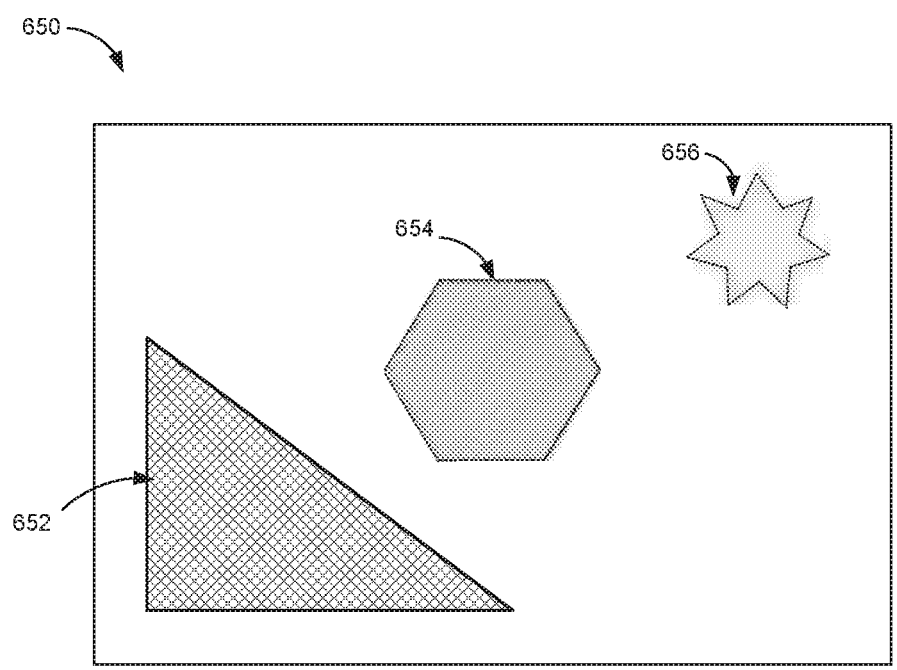
FIG. 6B illustrates an exemplary diagram for a rendered image frame with adjusted image focus, in accordance with some embodiments.

FIG. 6B illustrates an exemplary diagram for a rendered image frame with adjusted image focus, in accordance with some embodiments. In some embodiments as shown in FIG. 6B, a processed (e.g., rendered) image 650 is obtained using one or more rendering parameters. After processing, object 652 appears to be sharp and clear to the human eye, and objects 654 and 656 (as illustrated in dashed lines to reflect the blurry effect) appear to be blurry to the human eye. In some embodiments, object 656 appears to be blurrier than object 654, because the rendering parameter(s) used for processing layers including object 656 are greater than the rendering parameter(s) used for processing layers including object 654. Using the processes as discussed in the present disclosure, an image frame can be first captured by the imaging system borne on a movable platform, and the image frame can be processed after the capturing based on a user selection and/or a user input to adjust image focus.

FIGS. 7A-7E are a flow diagram illustrating a method 700 for image processing to adjust image focus, in accordance with some embodiments. The method 700 is performed at an electronic device, such as the movable platform 102, the imaging device 216, the remote control 108, id/or the computing device 110. In some other embodiments, the method 700 is performed by other electronic device(s), such as a mobile device 120 (FIG. 3A) or a computing device paired with the remote control 108 for operating the movable platform 102. Operations performed in FIGS. 7A-7E correspond to instructions stored in computer memories or other computer-readable storage mediums of the corresponding device(s).

The electronic device obtains (702) depth information respectively corresponding to one or more objects (e.g., objects 130, FIG. 3A) in a first image frame captured by an imaging system based on spatial configuration of the imaging system. In some embodiments, obtaining the depth information respectively corresponding to one or more objects comprises (710) obtaining the spatial configuration of the imaging system at which the imaging system captures the first image frame. In some embodiments, a set of spatial data is obtained for describing a position of the imaging system when the first image frame is captured. A set of spatial data includes sensor data obtained from the one or more sensors.

In some embodiments, the imaging system comprises (712) a monocular imaging device (e.g., imaging device 216, FIG. 2A) borne on a movable platform (e.g., carrier 104, FIG. 2B). The one or more sensors are configured to measure translational and rotational movement data of the imaging system during a time period when the first image frame is captured by the monocular imaging device, e.g., imaging device 216. In some embodiments, the first image frame is associated with a set of translational and rotation movement data of the imaging device 216.

In some embodiments, the one or more sensors comprise (714) at least an inertial measurement unit (IMU) (e.g., including motion sensors 270, rotation sensors, and/or magnetometers, etc., FIG. 2C) associated with the movable platform (e.g., carrier 104 or the movable platform 102). In some embodiments, the one or more sensors comprises one or snore sensing devices selected from the movable platform sensing system 210 (FIG. 2C). For example, the one or more sensors further comprise GPS sensor 268 configured to provide translational movement data of the imaging system. In some embodiments, when there is relative movement between the movable platform 102 and the imaging device 216 (e.g., or carrier 104), the one or more spatial configuration of the imaging device 216 is obtained by integrating sensor data gathered from one or more sensing devices of the movable platform sensing system 210 (FIG. 2C) and one or more sensing devices of the carrier sensing system 238 (FIG. 2B).

In some embodiments, the rotational data and the transitional data are (716) used to determine the depth information of the one or more objects, as discussed with reference to FIGS. 3A-3B. For example, the rotational data and the transitional data collected from the IMU and the GPS sensors are used for determining the rotational matrix, translational matrix, and essential matrix related to the movement of the imaging system. Corresponding characteristic points can be determined between the one or more image frames using the rotational matrix, translational matrix, and essential matrix. The 3-dimensional coordinate, e.g., depth information, related to a 3-dimensional distance between an object (e.g., point/pixel) and the imaging system can also be determined.

In some embodiments, the one or more sensors comprise (718) a visual odometry (VO) system (e.g., VO system 276, FIG. 2C) configured to provide motion information of the imaging system (e.g., imaging device 216). In some embodiments, the one or more sensors comprise (720) a depth sensor configured to provide the depth information of the one or more objects. For example, a TOF camera (e.g., TOF camera 282, FIG. 2C,) is used for calculating a distance of each point in an image frame based on the speed of light. When the TOF camera 282 is used for determining the depth information, one image frame may be used.

In some embodiments, the imaging system comprises (722) a plurality of stereoscopic imaging devices (e.g., stereographic image sensors 252 and 254, FIG. 2C) configured to capture a plurality of stereoscopic image frames that provide the depth information of the one or more objects. In some embodiments, the spatial configuration of the imaging system is (724) related to a distance between a plurality of stereoscopic imaging devices in the plurality of stereoscopic imaging devices. For example, the depth information for each object is determined based on disparity values of pixels between the pair of stereoscopic image frames, the distance between the pair of stereoscopic imaging devices, and the focal length of the stereoscopic imaging sensors.

The electronic device calculates (704) one or more rendering parameters associated with a first object of the one or more objects in the first image frame based on at least the respective depth information of the one or more objects. In some embodiments, the first image frame is an image frame selected from one or more image frames captured by the imaging system for determining the depth information. For example, the first image frame is an image frame selected from image frames 320 and 300 of FIG. 3B. In some embodiments, the first image frame is not an image frame selected from the one or more image frames captured by the imaging system for determining the depth information. For example, the first image frame is an image frame captured by the imaging system subsequent to the one or more image frames for determining the depth information. In some embodiments, the depth information in the first image frame can be estimated using the determined depth information in the one or more image frames.

In some embodiments, the electronic device selects (750), in the first image frame, the first object from the one or more objects. In some embodiments, selecting the first object from the one or more objects comprises (752) receiving a user selection of the first object from the one or more objects. For example, the electronic device receives a user interaction, e.g., user interaction 512, to select object 504 included in the in-focus region. In some embodiments, selecting the first object from the one or more objects comprises (754) receiving a user input, e.g., user input 514, to provide an aperture parameter. In some embodiments, the first object selected from the one or more objects is (756) included in the in-focus region. For example, object 504 of FIG. 4A is selected to be included in the in-focus region 522. In some embodiments, the first object selected from the one or more objects is (758) included in the out-of-focus region. For example, objects 604 and 606 of FIG. 6A are selected to be included in the out-of-focus regions 622 and 624.

In some embodiments, the electronic device tracks the one or more objects in the one or more image frames captured by the imaging system for determining the depth information. The one or more objects are tracked using optical flow vector tracking, characteristic points matching, block matching, or other suitable algorithms. In some embodiments, the electronic device tracks (768) the first object in one or more image frames captured by the imaging system. The one or more image frames may or may not include the first image frame. The one or more image frames may be used for determining the depth information of the one or more objects, such as image frames 320 and 330, FIG. 3B. For example, the electronic device detects the selected first object in each image frame of the one or more image frames using optical flow vector tracking, characteristic points matching, block matching, or other suitable algorithms.

The electronic device renders (706) a processed image based on the first image frame using the one or more rendering parameters. The processed image frame includes an in-focus region and an out-of-focus region relative to the first object. In some embodiments, the in-focus region appears to be sharp and focused to a human eye, and the out-of-focus region appears to be blurry and out-of-focus to the human eye. The electronic device renders the first image frame using the one or more rendering parameters to obtain a processed image frame including the in-focus region and the out-of-focus region relative to the first object. In some embodiments, in response to receiving the user selection (e.g. user interaction 512, FIG. 4A) or the user input (e.g., user input 514, FIG. 4A), the electronic device determines a σ-L curve, such as σ-L curve 530 in FIG. 4B. Rendering parameters can be determined using the σ-L curve for respective layers to be processed for selective focusing.

In some embodiments, the electronic device groups (730) the one or more objects objects 402, 404, and 406, FIG. 4A) in the first image frame into a number of layers (e.g., layers 410, 420, and 430, FIG. 4A) based on the depth information of the respective objects. Each layer comprises a plurality of pixels representing one or more objects at a certain distance from the camera. In some embodiments, calculating the one or more rendering parameters comprises (732) calculating a plurality of rendering parameters (e.g., $\sigma_1$, $\sigma_2$, $\sigma_3$, FIG. 4A) corresponding to the number of layers (e.g., layers 410, 420, and 430, FIG. 4A) respectively based on the depth information associated with each layer. In some embodiments, rendering the first image frame comprises (734) rendering each layer of the number of layers (e.g., layers 410, 420, and 430, FIG. 4A) using a corresponding rendering parameter of the plurality of rendering parameters (e.g., $\sigma_1$, $\sigma_2$, $\sigma^3$, FIG. 4A). In some embodiments, rendering the first image frame comprises (736) applying Gaussian blurring to one or more layers using rendering parameters corresponding to the one or more layers respectively. For example, as shown in the $\sigma$-L curve 530 in FIG. 4B, rendering parameters $\sigma_1$, $\sigma_2$, $\sigma_3$ are used to perform Gaussian blurring to layers $L_1$, $L_2$, and $L_3$ respectively.

In some embodiments, the one or more layers include (738) the first object selected to be included in the in-focus region, such as object 504 in FIG. 4A. For example, the one or more layers to which the Gaussian blurring is performed include the first object. In some embodiments, the one or more layers do not include (740) the first object selected to be included in the in-focus region, such as object 504 in FIG. 4A. For example, the one or more layers to which the Gaussian blurring is performed do not include the first object. The electronic device performs Gaussian blurring to the one or more layers excluding the layer including the first object. In some embodiments, the electronic device further smoothes (742) transitions of rendering effects to the number of layers.

In some embodiments, the imaging system (e.g., imaging device 216) is (760) borne on a movable platform (e.g., carrier 104 of movable platform 102, FIGS. 1 and 2A-2B), and the electronic device is (760) located on a remote (e.g., remote control 108 or mobile device 120, FIG. 3A) configured to remotely control the movable platform.

In some embodiments, the imaging system (e.g., imaging device 216) is (762) borne on a movable platform (e.g., carrier 104 of movable platform 102, FIGS. 1 and 2A-2B), and the electronic device is (762) borne on the movable platform (or the movable platform 102) and communicably coupled to the imaging system.

In some embodiments, after the imaging system captures a plurality of image frames, the electronic device stitches (764) a panorama view (as the first image frame for processing) using a set of image frames captured by the imaging system. The stitched panorama view includes more objects than any image frame of the selected set of image frames. In some embodiments, the electronic device renders (766) the panorama view using the one or more rendering parameter. For example, depth information of pixels within the panorama view can be determined based on the depth information obtained from the set of image frames. The pixels or objects within the panorama view can be grouped into a plurality of layers. In some embodiments, the electronic device receives a user interaction within the panorama view for selecting an object to be in-focus or out-of-focus. The electronic device then calculates a rendering parameter for each individual layer of the plurality of layers. The electronic device then process the panorama view using the calculated rendering parameters to obtain the processed panorama image including an in-focus region and an out-of-focus region relative to the selected object.

Many features of the present disclosure can be performed in, using, or with the assistance of hardware, software, firmware, or combinations thereof. Consequently, features of the present disclosure may be implemented using a processing system. Exemplary processing systems (e.g., processor(s) 202, processors of the remote control 108, processors of the computing device 110, and/or processors of the imaging device 216) include, without limitation, one or more general purpose microprocessors (for example, single or multi-core processors), application-specific integrated circuits, application-specific instruction-set processors, field-programmable gate arrays, graphics processors, physics processors, digital signal processors, coprocessors, network processors, audio processors, encryption processors, and the like.

Features of the present disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 204) can include, but is not limited to, any type of disk including floppy disks, optical discs, DVD, CD-ROMs, microdrive, and magneto-optical discs, ROMs, RAMs, EPROMs, EEPROMs, DRAMs, VRAMs, DDR RAMS, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems, and execution environments/containers.

Communication systems as referred to herein (e.g., the communication system 206) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), spread spectrum technology such as FASST or DESST, or any other suitable communication protocol, including communication protocols not yet developed as of the filing date of this document.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method of image processing, the method comprising:
   obtaining depth information respectively corresponding to one or more objects in an image frame captured by an imaging system based on spatial configuration of the imaging system;
   calculating one or more rendering parameters associated with one of the one or more objects in the image frame based on at least the depth information of the one or more objects, including:
      determining a depth range of the image frame, the depth range being between a nearest object that is nearest to the imaging system among the one or more objects and a farthest object that is farthest to the imaging system among the one or more objects;
      dividing the depth range into a plurality of layers; and
      for each layer of the plurality of layers:
         determining corresponding depth information that is associated with one of an average depth of all pixels in each layer or a depth of one or more representative pixels for a distinctive object in each layer; and
         calculating a rendering parameter for each respective layer according to the corresponding depth information corresponding to the respective layer; and
   rendering the image frame using the one or more rendering parameters to obtain a processed image frame, wherein the processed image frame includes an in-focus region and an out-of-focus region relative to the one of the one or more objects,
   wherein the method further comprises:
   in response to a user interaction to select an object for including in the in-focus region of the image frame, determining a layer that includes pixels at an on-focus point
   based on the calculated one or more rendering parameters, determining layers $l_{i-m}, l_{i-m+1}, \ldots, l_{i-1}, l_i$ in a first in-focus sub-region of the in-focus region and layers $l_i$, $l_{i+1}, \ldots, l_{i+n-1}, l_{i+n}$ in a second in-focus sub-region of the in-focus region, the first in-focus sub-region being on a side of the on-focus point that is proximal to the imaging system, the second in-focus sub-region being on a side of the on-focus point that is distal to the imaging system, m, i, and n being positive integers, and i>m; and
   determining layers $l_1, l_2, \ldots, l_{i-m-1}$ in a first out-of-focus sub-region of the out-of-focus region and layers $l_{i+n+1}, l_{i+n+2}, \ldots, l_{j-1}, l_j$, in a second out-of-focus sub-region of the out-of-focus region, the first out-of-focus sub-region being on a side of the in-focus region that is proximal to the imaging system, the second out-of-focus sub-region being on a side of the in-focus region that is distal to the imaging system, j being a positive integer, and j>i+n.

2. The method of claim 1, wherein obtaining the depth information respectively corresponding to the one or more objects comprises:
   obtaining the spatial configuration of the imaging system when the imaging system captures the image frame.

3. The method of claim 2, wherein the imaging system comprises a monocular imaging device borne on a movable platform, and wherein one or more sensors are configured to measure translational and rotational movement data of the imaging system during a time period when the image frame is captured by the monocular imaging device.

4. The method of claim 3, wherein the translational and rotational movement data includes:
a first translational matrix and a first rotational matrix representing a first spatial position corresponding to a start time of the time period, and
a second translational matrix and a second rotational matrix representing a second spatial position corresponding to an end time of the time period, the movable platform moving from the first spatial position to the second spatial position during the time period.

5. The method of claim 3, wherein the one or more sensors comprise at least an inertial measurement unit (IMU) associated with the movable platform.

6. The method of claim 2, wherein the one or more sensors comprise a depth sensor configured to provide the depth information corresponding to the one or more objects.

7. The method of claim 1, further comprising:
smoothing transitions of rendering effects to the plurality of layers.

8. The method of claim 1, further comprising:
stitching a plurality of raw image frames captured by the imaging system into a panorama view as the image frame, wherein the panorama view includes more objects than any one of the raw image frames; and
rendering the panorama view using the one or more rendering parameters.

9. The method of claim 1, further comprising:
processing an overlapped area of one or more sets of pixels, one or more regions of the image frame, or one or more of the plurality of layers, by an image smoothing algorithm, to obtain a smooth transitional overlapped area.

10. The method of claim 1, wherein each layer includes at least a complete object in the image.

11. The method of claim 1,
wherein the one or more rendering parameters include a standard deviation of a Gaussian distribution used to convolve the plurality of layers in rendering the image frame.

12. The method of claim 1, further comprising:
determining a first layer of the plurality of layers to be an in-focus layer corresponding to a first rendering parameter; and
processing a second layer of the plurality of layers and a third layer of the plurality of layers to be separate out-of-focus layers, the second layer and the third layer being adjacent to the first layer, the second layer corresponding to a second rendering parameter, the third layer corresponding to a third rendering parameter, and the first rendering parameter, the second rendering parameter, and the third rendering parameter being different from each other.

13. The method of claim 1, wherein the one or more rendering parameters corresponding to the layers $l_{i-m}$, $l_{i-m+1}$, ......, $l_{i+n-1}$, $l_{i+n}$ are zeros.

14. The method of claim 1, wherein:
the one or more rendering parameters including a plurality of rendering parameters $\sigma_1, \sigma_2, \ldots, \sigma_j$ corresponding to the layers $l_1, l_2, \ldots, l_j$, respectively, and $\sigma_1 > \sigma_2 > \ldots > \sigma_{i-m-1}$ and $\sigma_{i+n+1} < \ldots < \sigma_{j-1} < \sigma_j$.

15. The method of claim 1, wherein following equations are satisfied:

$$|\Delta L_1| = \left| \frac{F\sigma L^2}{f^2 + F\sigma L} \right|$$

$$|\Delta L_2| = \left| \frac{-F\sigma L^2}{f^2 - F\sigma L} \right|$$

$|\Delta L_1|$ representing a depth of the first in-focus sub-region, $|\Delta L_2|$ representing a depth of the second in-focus sub-region, $\sigma$ being a diameter of a circle of confusion corresponding to the selected object included in the in-focus region, L being a distance between the on-focus point and the imaging system, f being a focal length of the imaging system, and F being an aperture parameter of the imaging system.

16. A system of image processing, the system comprising:
one or more processors; and
a memory storing one or more programs configured to be executed by the one or more processors, the one or more programs including instructions for:
obtaining depth information respectively corresponding to one or more objects in a image frame captured by an imaging system based on spatial configuration of the imaging system;
calculating one or more rendering parameters associated with one of the one or more objects in the image frame based on at least the respective depth information of the one or more objects, including:
determining a depth range of the image frame, the depth range being between a nearest object that is nearest to the imaging system among the one or more objects and a farthest object that is farthest to the imaging system among the one or more objects;
dividing the depth range into a plurality of layers; and
for each layer of the plurality of layers:
determining corresponding depth information that is associated with one of an average depth of all pixels in each layer of a depth of one or more representative pixels for a distinctive object in each layer; and
calculating a rendering parameter for each respective layer according to the corresponding depth information corresponding to the respective layer; and
rendering the image frame using the one or more rendering parameters to obtain a processed image frame, wherein the processed image frame includes an in-focus region and an out-of-focus region relative to the one of the one or more objects, wherein:
the one or more programs further includes instructions for:
in response to a user interaction to select an object for including in the in-focus region of the image frame, determining a layer that includes pixels at an on-focus point
based on the calculated one or more rendering parameters, determining layers $l_{i-m}, l_{i-m+1}, \ldots, l_{i-1}, l_i$ in a first in-focus sub-region of the in-focus region and layers $l_i, l_{i+1}, \ldots, l_{i+n-1}, l_{i+n}$ in a second in-focus sub-region of the in-focus region, the first in-focus sub-region being on a side of the on-focus point that is proximal to the imaging system, the second in-focus sub-region being on a side of the on-focus point that is distal to the imaging system, m, i, and n being positive integers, and i>m; and determining layers $l_1, l_2, \ldots, l_{i-m-1}$ in a first out-of-focus sub-region of the out-of-focus region and layers $l_{i+n+1}, l_{i+n+2}, \ldots, l_{j-1}, l_j$, in a second out-of-focus sub-region of the out-of-focus region, the first out-of-focus sub-region being on a side of the in-focus region that is proximal to the imaging system, the second out-of-focus sub-region being on a side of the in-focus region that is distal to the imaging system, j being a positive integer, and j>i+n.

17. An unmanned aerial vehicle (UAV), comprising:
a propulsion system;
an imaging system; and
one or more processors coupled to the propulsion system and the imaging system, the one or more processors being configured for:
obtaining depth information respectively corresponding to one or more objects in an image frame captured by an imaging system based on spatial configuration of the imaging system;
calculating one or more rendering parameters associated with one of the one or more objects in the image frame based on at least the respective depth information of the one or more objects, including:
  determining a depth range of the image frame, the depth range being between a nearest object that is nearest to the imaging system among the one or more objects and a farthest object that is farthest to the imaging system among the one or more objects;
  dividing the depth range into a plurality of layers; and
  for each layer of the plurality of layers:
    determining corresponding depth information that is associated with one of an average depth of all pixels in each layer or a depth of one or more representative pixels for a distinctive object in each layer; and
  calculating a rendering parameter for each respective layer according to the corresponding depth information corresponding to the respective layer; and
rendering the image frame using the one or more rendering parameters to obtain a processed image frame, wherein the processed image frame includes an in-focus region and an out-of-focus region relative to the one of the one or more objects, wherein the one or more processor is further configured to:
in response to a user interaction to select an object for including in the in-focus region of the image frame, determining a layer $l_i$ that includes pixels at an on-focus point
based on the calculated one or more rendering parameters, determining layers $l_{i-m}, l_{i-m+1}, \ldots, l_{i-1}, l_i$ in a first in-focus sub-region of the in-focus region and layers $l_i, l_{i+1}, l_{i+n-1}, l_{i+n}$ in a second in-focus sub-region of the in-focus region, the first in-focus sub-region being on a side of the on-focus point that is proximal to the imaging system, the second in-focus sub-region being on a side of the on-focus point that is distal to the imaging system, m, i, and n being positive integers, and i>m; and
determining layers $l_1, l_2, \ldots, l_{i-m-1}$ in a first out-of-focus sub-region of the out-of-focus region and layers $l_{i+n+1}, l_{i+n+2}, \ldots, l_{j-1}, l_j$, in a second out-of-focus sub-region of the out-of-focus region, the first out-of-focus sub-region being on a side of the in-focus region that is proximal to the imaging system, the second out-of-focus sub-region being on a side of the in-focus region that is distal to the imaging system, j being a positive integer, and j>i+n.

* * * * *